United States Patent
Onishi et al.

(10) Patent No.: US 7,930,922 B2
(45) Date of Patent: Apr. 26, 2011

(54) SOOT GENERATION AMOUNT ESTIMATION APPARATUS FOR INTERNAL COMBUSTION ENGINE

(75) Inventors: Tomomi Onishi, Susono (JP); Takao Fukuma, Susono (JP); Shigeki Nakayama, Susono (JP); Yoshiki Takatori, Aichi-gun (JP); Shuichi Kubo, Toyoake (JP); Satoshi Yamazaki, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 870 days.

(21) Appl. No.: 11/792,665

(22) PCT Filed: Jul. 13, 2006

(86) PCT No.: PCT/JP2006/314328
§ 371 (c)(1),
(2), (4) Date: Jun. 8, 2007

(87) PCT Pub. No.: WO2007/018019
PCT Pub. Date: Feb. 15, 2007

(65) Prior Publication Data
US 2010/0058832 A1    Mar. 11, 2010

(30) Foreign Application Priority Data

Aug. 8, 2005 (JP) ................................. 2005-228985

(51) Int. Cl.
*G01N 7/00* (2006.01)
(52) U.S. Cl. .................................... 73/23.31; 73/114.69
(58) Field of Classification Search .................. 73/23.31, 73/114.69, 114.71
See application file for complete search history.

(56) References Cited

U.S. PATENT DOCUMENTS 6,829,890 B2 * 12/2004 Gui et al. ........................ 60/295
6,941,750 B2 *  9/2005 Boretto et al. .................. 60/297
(Continued)

FOREIGN PATENT DOCUMENTS

JP        A-11-037899          2/1999
(Continued)

OTHER PUBLICATIONS

Svensson, "Effects of Fuel Molecular Structure and Composition on Soot Formation in Direct-Injection Spray Flames," Dissertation, Brigham Young University, May 18, 2005.

(Continued)

*Primary Examiner* — Freddie Kirkland, III
(74) *Attorney, Agent, or Firm* — Oliff & Berridge, PLC

(57) ABSTRACT

A soot generation amount estimation apparatus obtains a generation speed of a precursor of soot (accordingly, the concentration of the precursor) in consideration of formation of the precursor from fuel, thermal decomposition of the formed precursor, and formation of soot from the formed precursor, and estimates a generation speed of soot (accordingly, the concentration of soot (the generation amount of soot)) in consideration of formation of soot from the precursor, which depends on the concentration of the precursor, and oxidation of the formed soot. The apparatus employs a reaction model in which the reaction process in which soot is generated from fuel is divided into two steps; i.e., a reaction process in which a precursor is generated from fuel and a reaction process in which soot is generated from the precursor. Thus, phenomena, such as a "delay in soot generation" in the reaction process in which soot is generated from fuel, can be accurately simulated.

17 Claims, 14 Drawing Sheets

U.S. PATENT DOCUMENTS

| | | | |
|---|---|---|---|
| 7,031,827 B2 * | 4/2006 | Trudell et al. | 701/114 |
| 7,065,960 B2 * | 6/2006 | Gioannini et al. | 60/295 |
| 7,188,512 B1 * | 3/2007 | Wills | 73/23.31 |
| 7,263,825 B1 * | 9/2007 | Wills et al. | 60/295 |
| 7,478,527 B2 * | 1/2009 | Wills | 60/295 |
| 7,484,357 B2 * | 2/2009 | Dollmeyer et al. | 60/274 |
| 7,500,358 B2 * | 3/2009 | Singh et al. | 60/295 |
| 7,562,524 B2 * | 7/2009 | Wills | 60/297 |
| 2004/0204818 A1 * | 10/2004 | Trudell et al. | 701/114 |
| 2005/0165593 A1 * | 7/2005 | Lenormand et al. | 703/10 |
| 2009/0308052 A1 * | 12/2009 | Zhang et al. | 60/274 |

FOREIGN PATENT DOCUMENTS

| | | |
|---|---|---|
| JP | A-2000-170521 | 6/2000 |
| JP | A-2003-020933 | 1/2003 |
| JP | A-2003-307110 | 10/2003 |
| JP | A-2004-044457 | 2/2004 |

OTHER PUBLICATIONS

Kennedy, "Models of soot formation and oxidation," *Progress in Energy and Combustion Science*, vol. 23, pp. 95-132 (1997).

Frenklach, "Reaction mechanism of soot formation in flames," *Physical Chemistry-Chemical Physics PCCP*, vol. 4, pp. 2028-2037 (2002).

Wakuri et al., "Studies on the Penetration of Fuel Spray of Diesel Engine," *The Transactions of the Japanese Society of Mechanical Engineers*, pp. 820-826, No. 25-156 (1959).

Hiroyasu et al., "Combustion Model of Direct-Injection-Type Diesel Engine and Performance Prediction," *The Transactions of the Japanese Society of Mechanical Engineers* (book B), pp. 1606-1632, vol. 48, No. 432, Oct. 20, 1981.

Construction of Soot Generation Reaction Model from Diesel Combustion, Akira Miyoshi, Report of General Sekiyu Research and Development Encouragement and Assisted Foundation, Japan, Dec. 1, 2002, No. 10, pp. 119-123.

Kinetic Modeling of Soot Formation Process on Diesel Combustion Field, Takayuki Ito et al., Annual Meeting Reports of the Japan Society of Mechanical Engineers, Japan, Aug. 22, 2001, vol. 2001, No. 2, pp. 525-526.

Formation and Oxidation Dynamics of Soot Particle, Noboru Miyamoto, Diesel Forum 2001(2), LEMA, Apr. 25, 2002, No. 467, pp. 23-30.

Particulate Generation and Combustion, Kazuo Nakanishi et al., Japan, Apr. 1982, No. 59, pp. 1-14.

Japanese Office Action dated Jun. 16, 2010 for Japanese Application No. 2005-228985 (with partial translation).

* cited by examiner

POST INJECTION TIME t = 0

POST INJECTION TIME t = t

SOOT GENERATION AMOUNT ESTIMATION APPARATUS FOR INTERNAL COMBUSTION ENGINE

TECHNICAL FIELD

The present invention relates to a soot generation amount estimation apparatus which estimates the amount of soot (fine particles of carbon) generated in a combustion chamber of an internal combustion engine as a result of reaction of fuel.

BACKGROUND ART

Soot is the main component of particulate matter (PM) generated in a combustion chamber of an internal combustion engine (particularly, a diesel engine). In order to accurately control the generation amount of such soot to thereby reduce the same, the generation amount of soot must be accurately estimated.

For example, an exhaust purifying apparatus for an internal combustion engine disclosed in Japanese Patent Application Laid-Open (kokai) No. 2004-44457 is configured to estimate the generation amount of PM, which changes in accordance with operating conditions of the engine, by making use of a map in which engine speed, accelerator opening, coolant temperature, etc. are used as arguments. When the PM generation amount is estimated, the amount of soot within the PM can be estimated.

Incidentally, in recent years, many studies have been performed on the mechanism of soot formation in a reaction process in which soot is generated from fuel. If the generation amount of soot can be estimated by means of a reaction model created on the basis of the soot formation mechanism, expectations are high that the generation amount of soot can be estimated more accurately.

DISCLOSURE OF THE INVENTION

In view of the foregoing, an object of the present invention is to provide a soot generation amount apparatus for an internal combustion engine which can accurately estimate the amount of soot generated within a combustion chamber by means of a reaction model based on the mechanism of soot formation.

The feature of a soot generation amount estimation apparatus of the present invention resides in that soot generation amount estimation means for estimating the amount of soot generated in a combustion chamber of an internal combustion engine as a result of reaction of fuel comprises soot generation speed calculation means for calculating a generation speed of soot by means of a reaction model (an equation representing the model) regarding a reaction process in which soot is generated from fuel.

By virtue of this configuration, the generation speed of soot is calculated by use of an equation representing a reaction model regarding a reaction process in which soot is generated from fuel and based on a mechanism of soot formation. The soot generation speed refers to, for example, rate of change in the soot amount within a gas mixture, rate of change in soot concentration within the gas mixture, or the like.

On the basis of the soot generation speed (specifically, by means of time integration (accumulating) of the soot generation speed), the soot generation speed is estimated. The soot generation speed refers to, for example, soot amount within the gas mixture, soot concentration within the gas mixture, or the like. Since the soot generation amount is estimated by use of an equation representing the reaction model based on the soot formation mechanism, the soot generation amount can be accurately estimated.

Incidentally, recent studies on the soot formation mechanism have gradually come to elucidate the reaction process in which soot is generated from fuel via a precursor of the soot. Accordingly, when a reaction model regarding a reaction process in which such a precursor is taken into consideration is created and the soot generation amount is estimated by use of an equation representing the reaction model, it is expected that the soot generation amount can be estimated more accurately.

That is, in the soot generation amount estimation apparatus of the present invention, preferably, a model regarding a reaction process in which soot is generated from fuel via a precursor of the soot is used as the reaction model. Here, the precursor is defined to be any monomer including at least one of PAH, aromatic intermediate, saturated polymer, and $C_2H_2$; and soot is defined to be a polymer formed through aggregation of two or more molecules of the precursor, which is a monomer. The precursor includes all types of monomers which can grow into soot through aggregation.

In this case, preferably, the soot generation amount estimation means further comprises precursor generation speed calculation means for calculating a speed at which the precursor is generated from fuel; and the soot generation speed calculation means calculates the soot generation speed on the basis of the calculated precursor generation speed. Here, the precursor generation speed refers to, for example, rate of change in the mass of the precursors within the gas mixture, rate of change in the concentration of the precursor within the gas mixture, or the like.

By virtue of this configuration, the precursor generation amount can be calculated on the basis of the precursor generation speed calculated by the precursor generation speed calculation means (specifically, by means of time integration (accumulation) of the precursor generation speed). Here, the precursor generation amount refers to, for example, the mass of the precursor within the gas mixture, the concentration of the precursor within the gas mixture, or the like. Subsequently, the soot generation speed is calculated on the basis of the precursor generation amount, and thus, the soot generation amount is estimated.

As described above, through use of a reaction model which involves generation of a precursor of soot in the course of a reaction process in which soot is generated from fuel, it becomes possible to accurately simulate a "delay in soot generation (reaction)," which is experimentally or empirically known to occur in a reaction process in which soot is generated from fuel. In addition, when the precursor generation speed is calculated in consideration of the "speed at which the precursor thermally decomposes" as described later, it becomes possible to accurately simulate a "phenomenon in which the soot generation speed decreases as the gas mixture temperature increases when the gas mixture temperature exceeds a certain temperature," which phenomenon is experimentally or empirically known.

In the soot generation amount estimation apparatus of the present invention, when the precursor generation speed calculation means is provided, preferably, the precursor generation speed calculation means includes precursor formation speed calculation means for calculating a speed at which the precursor is formed from fuel, precursor decomposition speed calculation means for calculating a speed at which the formed precursor is thermally decomposed, and soot formation speed calculation means for calculating a speed at which soot is formed from the precursor, wherein the precursor generation speed is calculated on the basis of the calculated precursor formation speed, precursor decomposition speed, and soot formation speed.

Formation of the precursor from fuel increases the precursor generation speed. Meanwhile, the formed precursor may be thermally decomposed. Such thermal decomposition of the precursor and formation of soot from the formed precursor reduce the precursor generation speed. That is, when the apparatus is configured to calculate the precursor generation speed on the basis of the calculated precursor formation speed, precursor decomposition speed, and soot formation speed, the precursor generation speed is calculated in consideration of all three of the reactions, so that the precursor generation speed can be accurately calculated.

Alternatively, the precursor generation speed calculation means includes precursor net formation speed calculation means for calculating a net formation speed of the precursor, which can be obtained by subtracting, from a speed at which the precursor is formed from fuel, a speed at which the formed precursor is thermally decomposed, and soot formation speed calculation means for calculating a speed at which soot is formed from the precursor, wherein the precursor generation speed is calculated on the basis of the calculated precursor net formation speed and soot formation speed.

According to this configuration, the net formation speed of the precursor, which is a value obtained by subtracting the precursor decomposition speed from the precursor formation speed, is calculated without independent calculation of the precursor formation speed and the precursor decomposition speed, and the precursor generation speed is calculated on the basis of the precursor net formation speed and the soot formation speed. Accordingly, it is possible to calculate the precursor generation speed in consideration of all three of the above-described reactions, while reducing the calculation load.

In the soot generation amount estimation apparatus of the present invention, when the soot generation speed calculation means is configured to calculate the soot generation speed on the basis of the precursor generation speed, preferably, the soot generation speed calculation means includes soot formation speed calculation means for calculating a speed at which soot is formed from the precursor, and soot oxidation speed calculation means for calculating a speed at which the formed soot is oxidized, wherein the soot generation speed is calculated on the basis of the calculated soot formation speed and soot oxidation speed.

Formation of soot from the precursor increases the soot generation speed. Meanwhile, the formed soot may be oxidized. Such oxidation of soot lowers the soot generation speed. That is, when the apparatus is configured to calculate the soot generation speed on the basis of the calculated soot formation speed and soot oxidation speed, the soot generation speed is calculated in consideration of the two reactions, so that the soot generation speed can be accurately calculated.

In the soot generation amount estimation apparatus of the present invention, when the soot formation speed calculation means is provided, preferably, the soot formation speed calculation means includes first soot formation speed calculation means for calculating a first soot formation speed, which is a speed at which soot is formed because of mutual collision of molecules of the precursor, and second soot formation speed calculation means for calculating a second soot formation speed, which is a speed at which soot is additionally formed because of collision between molecules of the precursor and molecules of the soot, wherein the soot formation speed is calculated on the basis of the calculated first and second soot formation speeds.

In the reaction process in which soot is formed from the precursor, two reactions are considered to occur; i.e., a first reaction in which soot is formed through aggregation as a result of mutual collision of molecules of the precursor, and a second reaction in which soot is newly formed through aggregation as a result of collision between molecules of the precursor and molecules of the formed soot. According to the above-described configuration, the soot formation speed is calculated in separate consideration of the first soot formation speed and the second soot formation speed, which correspond to these two reactions. Therefore, the soot formation speed can be accurately calculated.

In this case, preferably, the first soot formation speed calculation means is configured to calculate the first soot formation speed in consideration of a probability of formation of soot attributable to mutual collision of molecules of the precursor, and the second soot formation speed calculation means is configured to calculate the second soot formation speed in consideration of a probability of additional formation of soot attributable to collision between molecules of the precursor and molecules of the formed soot.

Specifically, in this case, the first soot formation speed calculation means is configured to calculate the first soot formation speed in consideration of the number of collisions (the number of collisions per unit mass of the gas mixture) of molecules of the precursor and/or a probability at which collided molecules of the precursor aggregate, and the second soot formation speed calculation means is configured to calculate the second soot formation speed in consideration of the number of collisions (the number of collisions per unit mass of the gas mixture) between molecules of the precursor and molecules of the soot and/or a probability at which collided molecules of the precursor and the soot aggregate.

The first soot formation speed depends on the probability at which soot is formed as a result of mutual collision of molecules of the precursor. This probability can be represented by the number of collisions (the number of collisions per unit mass of the gas mixture) of molecules of the precursor and the probability at which collided molecules of the precursor aggregate. Similarly, the second soot formation speed depends on the probability at which soot is additionally formed as a result of collision between molecules of the precursor and molecules of the formed soot. This probability can be represented by the number of collisions (the number of collisions per unit mass of the gas mixture) between molecules of the precursor and molecules of the soot and/or the probability at which collided molecules of the precursor and the soot aggregate.

Accordingly, by virtue of the above-described configuration, the first soot formation speed and the second soot formation speed can be calculated more accurately, and thus, the soot generation speed can be calculated more accurately, whereby the soot generation amount can be calculated more accurately.

In general, the greater the inter-molecular force; i.e., the greater the mass of molecules, the more likely the mutual aggregation of molecules occurs. The mass of each molecule of soot, which is a polymer, is greater than that of each molecule of the precursor, which is a monomer. Accordingly, the probability at which the collided molecules of the precursor and the soot aggregate is preferably set to be greater than the probability at which the collided molecules of the precursor aggregate together.

Further, the first soot formation speed calculation means is preferably configured to calculate the number of mutual collisions of molecules of the precursor on the basis of the concentration of the precursor within the gas mixture formed as a result of mixing of fuel and a cylinder interior gas (gas taken into the combustion chamber), and the temperature of the gas mixture; and the second soot formation speed calculation means is preferably configured to calculate the number of collisions between molecules of the precursor and molecules of the soot on the basis of the concentration of the precursor within the gas mixture, the concentration of the soot within the gas mixture, and the temperature of the gas mixture.

In general, the number of collisions (per unit mass of a gas) between substances A and B in the gas depends on the concentration of the substance A within the gas, the concentration of the substance B within the gas, and the temperature of the gas. Accordingly, the above-described number of mutual collisions (per unit mass of the gas mixture) of molecules of the precursor depends on the concentration of the precursor within the gas mixture and the temperature of the gas mixture. Similarly, the above-described number of collisions (per unit mass of the gas mixture) between molecules of the precursor and molecules of the soot depends on the concentration of the precursor within the gas mixture, the concentration of the soot within the gas mixture, and the temperature of the gas mixture. That is, the above-described configuration enables accurate calculation of the number of mutual collisions (per unit mass of the gas mixture) of molecules of the precursor and the number of collisions (per unit mass of the gas mixture) between molecules of the precursor and molecules of the soot.

Incidentally, in the case where a reaction model regarding a reaction process in which soot is generated from fuel via a precursor of the soot is used in the soot generation amount estimation apparatus of the present invention, when the gas mixture temperature is equal to or higher than a predetermined temperature, instead of the model regarding the reaction process in which soot is generated from fuel via a precursor of the soot, a model regarding a reaction process in which soot is generated directly from fuel may be used as the reaction model.

When the gas mixture temperature reaches a high temperature zone, the degree of the above-described "delay in soot generation (reaction)" in the reaction process in which soot is generated from fuel tends to decrease. In other words, when the gas mixture temperature becomes high (becomes equal to or higher than a predetermined temperature), the soot generation amount can be estimated with sufficient accuracy, even when a model regarding a reaction process in which soot is generated directly from fuel is used in place of the reaction model which involves generation of a precursor of soot in the course of the reaction process in which soot is generated from fuel.

The above-described configuration is based on such findings. This configuration reduces the calculation load associated with estimation of the soot generation amount, while preventing a decrease in the estimation accuracy of the soot generation amount, when the gas mixture temperature becomes high (becomes equal to or higher than a predetermined temperature).

In this case, preferably, the soot generation amount estimation means includes high-temperature-time soot formation speed calculation means, operable when the temperature of the gas mixture is equal to or higher than the predetermined temperature, for calculating the soot formation speed by use of a function for obtaining a value of the speed at which soot is formed from fuel on the basis of the gas mixture temperature, the value decreasing as the gas mixture temperature increases, wherein the soot generation speed calculation means calculates the soot generation speed on the basis of the soot formation speed calculated by the high-temperature-time soot formation speed calculation means, when the temperature of the gas mixture is equal to or higher than the predetermined temperature.

As described above, the "phenomenon in which the soot generation speed decreases as the gas mixture temperature increases when the gas mixture temperature exceeds a certain temperature," is experimentally or empirically known. Accordingly, in the case where the soot generation amount estimation means is configured such that, when the gas mixture temperature is equal to or higher than a predetermined temperature, the soot formation speed is calculated by use of a function for obtaining a value of the speed at which soot is formed from fuel on the basis of the gas mixture temperature, the value decreasing as the gas mixture temperature increases, the above-described phenomenon can be accurately simulated when the gas mixture temperature is equal to or higher than the predetermined temperature. In other words, when the gas mixture temperature is equal to or higher than the predetermined temperature, use of the model regarding a reaction process in which soot is generated directly from fuel enables the soot generation speed (accordingly, soot generation amount) to be estimated with sufficient accuracy, while reducing the calculation load.

Incidentally, in the soot generation amount estimation apparatus of the present invention, the model regarding a reaction process in which soot is directly generated from fuel may be always used as the reaction model. In this case, preferably, the soot generation amount estimation means further includes soot formation speed calculation means for calculating the soot formation speed by use of a function for obtaining a value of the speed at which soot is formed from fuel on the basis of the temperature of the gas mixture formed as a result of mixing of fuel and an cylinder interior gas (gas taken into the combustion chamber), the value assuming the maximum value when the gas mixture temperature coincides with a specific temperature and decreasing from the maximum value as the gas mixture temperature departs from the specific temperature, wherein the soot generation speed calculation means calculates the soot generation speed on the basis of the calculated soot formation speed.

In general, the soot generation speed increases with the gas mixture temperature until the gas mixture temperature reaches a certain temperature, and when the gas mixture temperature exceeds the certain temperature, the soot generation speed decreases as the gas mixture temperature increases. Accordingly, in the case where the soot generation amount estimation means is configured to calculate the soot formation speed by use of a function for obtaining a value of the speed at which soot is formed from fuel on the basis of the gas mixture temperature, the value assuming the maximum value when the gas mixture temperature coincides with a specific temperature and decreasing from the maximum value as the gas mixture temperature departs from the specific temperature, the soot generation speed (accordingly, soot generation amount) can be accurately estimated to a certain degree.

In this case, the soot formation speed calculation means is preferably configured to calculate the soot formation speed in consideration of a time delay in the reaction process in which soot is generated from fuel. By virtue of this configuration, it becomes possible to simulate the above-described "delay in soot generation (reaction)," which is experimentally or empirically known. As a result, irrespective of the gas mixture temperature, use of the model regarding a reaction process in which soot is directly generated from fuel enables the soot generation speed (accordingly, the soot generation amount) to be estimated with sufficient accuracy, while reducing the calculation load.

In the soot generation amount estimation apparatus of the present invention, preferably, the soot generation amount estimation means is configured to perform calculations for estimation of the soot generation amount only when the equivalent ratio of the gas mixture is equal to or higher than a predetermined value. The fact that soot is hardly formed when the equivalent ratio of the gas mixture is small is experimentally or empirically known.

Accordingly, the above-described configuration enables omitting the calculations for estimation of the soot generation amount when the equivalent ratio of the gas mixture is smaller than the predetermined value and soot is hardly formed. As a result, the calculation load can be reduced without lowering the estimation accuracy of the soot generation amount.

More preferably, the soot generation amount estimation means is configured to perform calculations for estimation of the soot generation amount only when the equivalent ratio of the gas mixture is equal to or higher than the predetermined value and the relation between the equivalent ratio of the gas mixture and the temperature of the gas mixture falls within a predetermined range. The fact that soot is hardly formed when the relation between the equivalent ratio of the gas mixture and the temperature of the gas mixture falls outside the predetermined range is experimentally or empirically known.

Accordingly, the above-described configuration enables omitting the calculations for estimation of the soot generation amount not only when the equivalent ratio of the gas mixture is smaller than the predetermined value but also when the equivalent ratio of the gas mixture is equal to or higher than the predetermined value but soot is hardly formed. As a result, the calculation load can be reduced further without lowering the estimation accuracy of the soot generation amount.

In the soot generation amount estimation apparatus of the present invention, preferably, the soot generation amount estimation means is configured to estimate the soot generation amount in consideration of the properties of the fuel. An example of the properties of the fuel is the content of aromatic hydrocarbon contained in the fuel.

The degree of a reaction in which soot is formed from fuel greatly depends on the properties of the fuel; for example, the greater the content of aromatic hydrocarbon contained in the fuel, the more easily soot is formed from fuel. Accordingly, by virtue of the above-described configuration, the soot generation amount can be estimated more accurately.

BEST MODE FOR CARRYING OUT THE INVENTION

An embodiment of a soot generation amount estimation apparatus for an internal combustion engine (diesel engine) according to the present invention will now be described with reference to the drawings.

Figure 1:
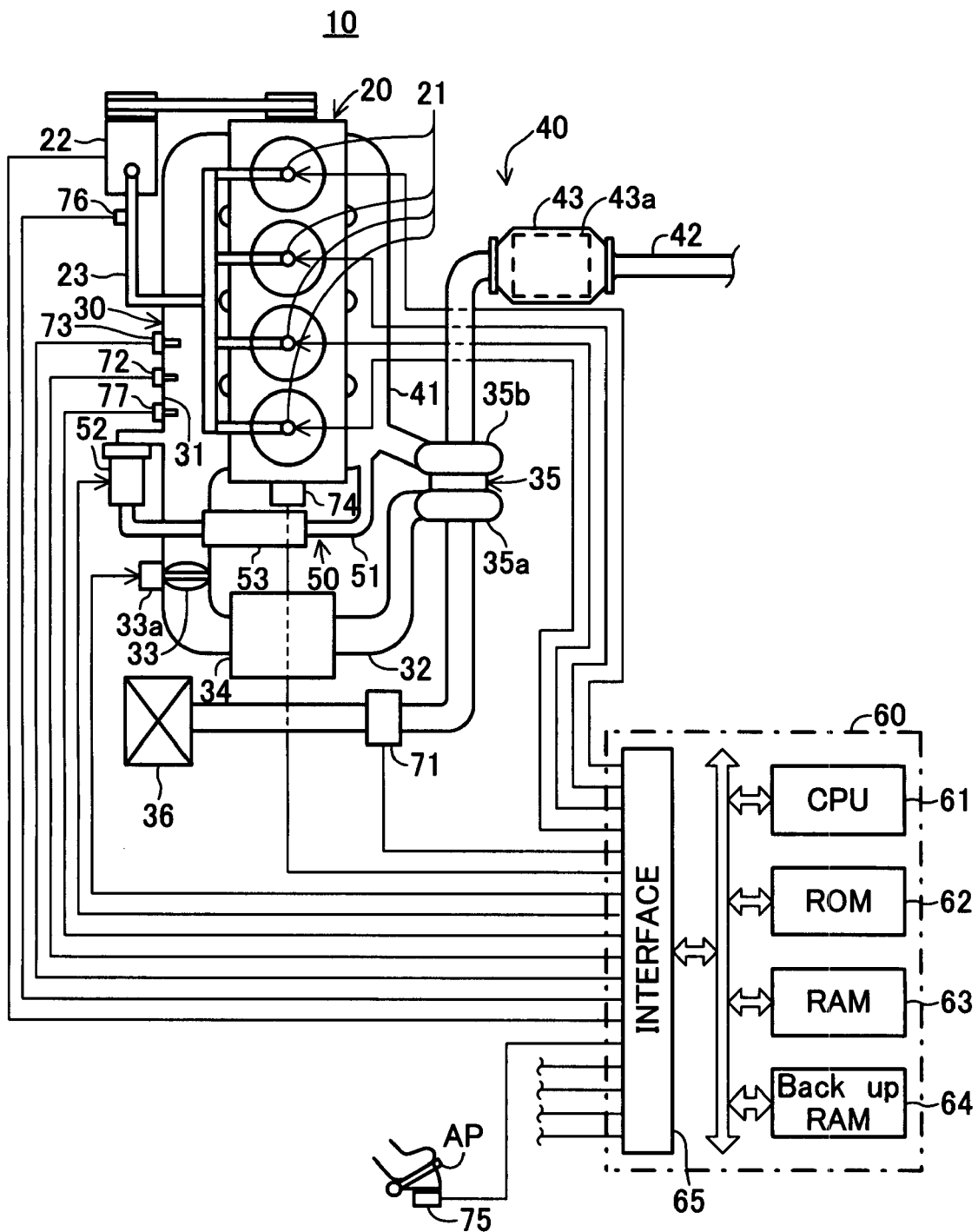
FIG. 1 a schematic diagram showing the overall configuration of a system in which a soot generation amount estimation apparatus for an internal combustion engine according to an embodiment of the present invention is applied to a four-cylinder internal combustion engine (diesel engine).

FIG. 1 schematically shows the entire configuration of a system in which a soot generation amount estimation apparatus according to the present invention is applied to a four-cylinder internal combustion engine (diesel engine) 10. This system comprises an engine main body 20 including a fuel supply system; an intake system 30 for introducing gas to combustion chambers (cylinder interiors) of individual cylinders of the engine main body 20; an exhaust system 40 for discharging exhaust gas from the engine main body 20; an EGR apparatus 50 for performing exhaust circulation; and an electronic control apparatus 60.

Fuel injection valves (injection valves, injectors) 21 are disposed above the individual cylinders of the engine main body 20. The fuel injection valves 21 are connected via a fuel line 23 to a fuel injection pump 22 connected to an unillustrated fuel tank. The fuel injection pump 22 is electrically connected to the electronic control apparatus 60. In accordance with a drive signal from the electronic control apparatus 60 (an instruction signal corresponding to an instruction final fuel injection pressure Pcrfin to be described later), the fuel injection pump 22 pressurizes fuel in such a manner that the actual injection pressure (discharge pressure) of fuel becomes equal to the instruction final fuel injection pressure Pcrfin.

Thus, fuel pressurized to the instruction final fuel injection pressure Pcrfin is supplied from the fuel injection pump 22 to the fuel injection valves 21. Moreover, the fuel injection valves 21 are electrically connected to the electronic control apparatus 60. In accordance with a drive signal (an instruction signal corresponding to an instruction fuel injection quantity (mass) Qfin) from the electronic control apparatus 60, each of the fuel injection valves 21 opens over an injection period TAU so that the fuel pressurized to the instruction final fuel injection pressure Pcrfin is injected directly to the combustion chamber of the corresponding cylinder in the instruction fuel injection quantity Qfin.

The intake system 30 includes an intake manifold 31, which is connected to the respective combustion chambers of the individual cylinders of the engine main body 20; an intake pipe 32, which is connected to an upstream-side branching portion of the intake manifold 31 and constitutes an intake passage in cooperation with the intake manifold 31; a throttle valve 33, which is rotatably held within the intake pipe 32; a throttle valve actuator 33a for rotating the throttle valve 33 in accordance with a drive signal from the electronic control apparatus 60; an intercooler 34, which is interposed in the intake pipe 32 to be located on the upstream side of the throttle valve 33; a compressor 35a of a turbocharger 35, which is interposed in the intake pipe 32 to be located on the upstream side of the intercooler 34; and an air cleaner 36, which is disposed at a distal end portion of the intake pipe 32.

The exhaust system 40 includes an exhaust manifold 41, which is connected to the individual cylinders of the engine main body 20; an exhaust pipe 42, which is connected to a downstream-side merging portion of the exhaust manifold 41; a turbine 35b of the turbocharger 35 interposed in the exhaust pipe 42; and a diesel particulate filter (hereinafter referred to as "DPNR") 43, which is interposed in the exhaust pipe 42. The exhaust manifold 41 and the exhaust pipe 42 constitute an exhaust passage.

The EGR apparatus 50 includes an exhaust circulation pipe 51, which forms a passage (EGR passage) for circulation of exhaust gas; an EGR control valve 52, which is interposed in the exhaust circulation pipe 51; and an EGR cooler 53. The exhaust circulation pipe 51 establishes communication between an exhaust passage (the exhaust manifold 41) located on the upstream side of the turbine 35b, and an intake passage (the intake manifold 31) located on the downstream side of the throttle valve 33. The EGR control valve 52 responds to a drive signal from the electronic control apparatus 60 so as to change the quantity of exhaust gas to be circulated (exhaust-gas circulation quantity, EGR-gas flow rate).

The electronic control apparatus 60 is a microcomputer which includes a CPU 61, ROM 62, RAM 63, backup RAM 64, an interface 65, etc., which are connected to one another by means of a bus. The ROM 62 stores a program to be executed by the CPU 61, tables (lookup tables, maps), constants, etc. The RAM 63 allows the CPU 61 to temporarily store data. The backup RAM 64 stores data in a state in which the power supply is on, and holds the stored data even after the power supply is shut off. The interface 65 contains A/D converters.

The interface 65 is connected to a hot-wire-type air flow meter 71 disposed in the intake pipe 32; an intake-gas temperature sensor 72, which is provided in the intake passage to be located downstream of the throttle valve 33 and downstream of a point where the exhaust circulation pipe 51 is connected to the intake passage; an intake pipe pressure sensor 73, which is provided in the intake passage to be located downstream of the throttle valve 33 and downstream of a point where the exhaust circulation pipe 51 is connected to the intake passage; a crank position sensor 74; an accelerator opening sensor 75; a fuel temperature sensor 76 provided in the fuel pipe 23 in the vicinity of the discharge port of the fuel injection pump 22; and an intake-gas oxygen concentration sensor 77 provided in the intake passage to be located downstream of the throttle valve 33 and downstream of the point where the exhaust circulation pipe 51 is connected to the intake passage. The interface 65 receives respective signals from these sensors, and supplies the received signals to the CPU 61.

Further, the interface 65 is connected to the fuel injection valves 21, the fuel injection pump 22, the throttle valve actuator 33a, and the EGR control valve 52; and outputs corresponding drive signals to these components in accordance with instructions from the CPU 61.

The hot-wire-type air flow meter 71 measures the mass flow rate of intake air passing through the intake passage (intake air quantity per unit time, new air quantity per unit time), and generates a signal indicating the mass flow rate Ga (air flow rate Ga). The intake-gas temperature sensor 72 measures the temperature of gas that is taken into each cylinder (i.e., each combustion chamber or cylinder interior) of the engine 10 (i.e., intake-gas temperature), and generates a signal representing the intake-gas temperature Tb. The intake pipe pressure sensor 73 measures the pressure of gas that is taken into each cylinder of the engine 10 (i.e., intake pipe pressure), and generates a signal representing the intake pipe pressure Pb.

The crank position sensor 74 detects the absolute crank angle of each cylinder, and generates a signal representing the actual crank angle CAact and the engine speed NE; i.e., rotational speed of the engine 10. The accelerator opening sensor 75 detects an amount by which an accelerator pedal AP is operated, and generates a signal representing the accelerator pedal operated amount Accp (hereinafter referred to as the "accelerator opening Accp"). The fuel temperature sensor 76 detects the temperature of fuel flowing through the fuel line 23, and generates a signal representing the fuel temperature Tcr. The intake-gas oxygen concentration sensor 77 detects the oxygen concentration of intake gas, and outputs a signal representing the intake-gas oxygen concentration RO2in.

Outline of Method for Estimating Soot Generation Amount

Next, there will be described a method for estimating soot generation amount by the soot generation amount estimation apparatus having the above-described configuration (hereinafter may be referred to as the "present apparatus").

Figure 2:
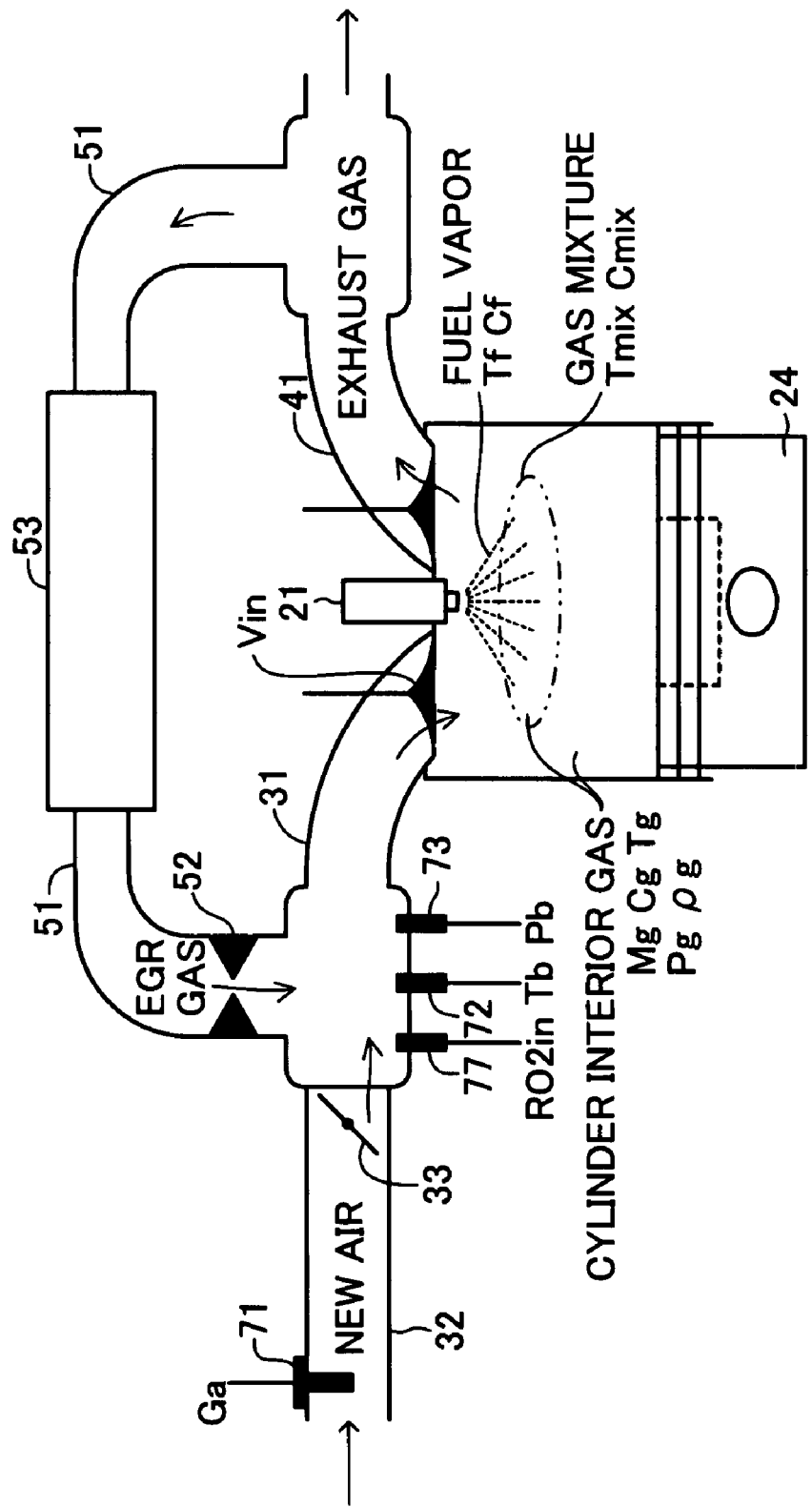
FIG. 2 is a diagram schematically showing a state in which gas is taken from an intake manifold to a certain cylinder and is then discharged to an exhaust manifold.

FIG. 2 is a diagram schematically showing a state in which gas is taken from the intake manifold 31 into a certain cylinder (combustion chamber) and is then discharged to the exhaust manifold 41. As shown in FIG. 2, the gas taken into the combustion chamber (accordingly, cylinder interior gas) includes new air taken from the tip end of the intake pipe 32 via the throttle valve 33, and EGR gas taken from the exhaust circulation pipe 51 via the EGR control valve 52.

The ratio (i.e., EGR ratio) of the quantity (mass) of the taken EGR gas to the sum of the quantity (mass) of the taken new air and the quantity (mass) of the taken EGR gas changes depending on the opening of the throttle valve 33 and the opening of the EGR control valve 52, which are properly controlled by the electronic control apparatus 60 (CPU 61) in accordance with the operating condition.

During an intake stroke, such new air and EGR gas are taken into the combustion chamber via an opened intake valve Vin as the piston moves downward, and the thus-produced gas mixture serves as cylinder interior gas. The cylinder interior gas is confined within the combustion chamber when the intake valve Vin closes upon the piston having reached the compression bottom dead center, and is then compressed in a subsequent compression stroke as the piston moves upward.

When the piston reaches a vicinity of the compression top dead center (specifically, when a fuel injection start timing (crank angle) CAinj to be described later) comes), the present apparatus opens the corresponding fuel injection valve 21 over an injection period TAU corresponding to the above-described instruction fuel injection quantity Qfin, to thereby inject fuel directly into the combustion chamber. As a result, the (liquid) fuel injected from an injection opening of the fuel injection valve 21 immediately becomes fuel vapor, because of heat received from the cylinder interior gas having become hot due to compression. With elapse of time, the fuel vapor disperses conically within the combustion chamber, while mixing with the cylinder interior gas to produce a gas mixture.

In actuality, the fuel of the instruction fuel injection quantity Qfin is continuously injected over the injection period TAU from the fuel injection start timing CAinj. However, in order to facilitate understanding, the description is continued under the assumption that the fuel of the instruction fuel injection quantity Qfin is injected at a time (instantaneously) at the fuel injection start timing CAinj.

Figure 3A:
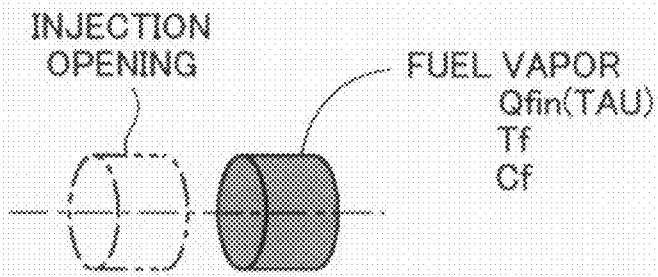
FIG. 3A is a diagram schematically showing a state of fuel at the time when the fuel is injected at a time.
Figure 3B:
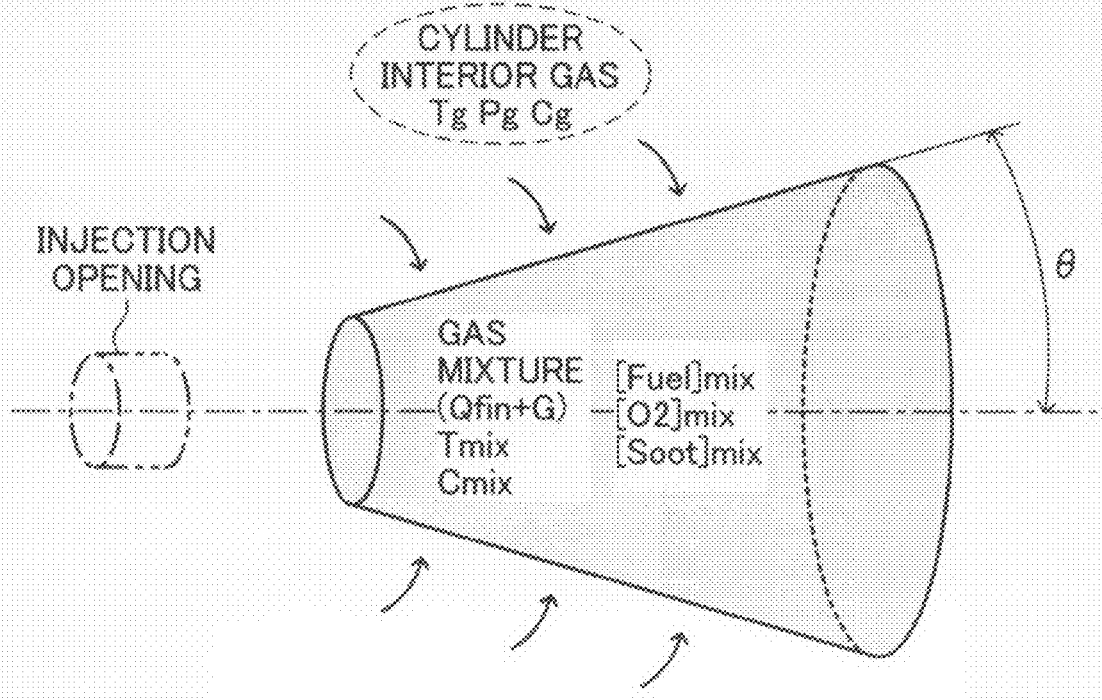
FIG. 3B is a diagram schematically showing a state in which fuel disperses conically while mixing with cylinder interior gas to thereby produce a gas mixture.

FIG. 3A is a diagram schematically showing the state of the fuel (fuel vapor) of the instruction fuel injection quantity (mass) Qfin at the time when it is injected from the injection opening of the fuel injection valve 21 (that is, the post injection time t=0). FIG. 3B is a diagram schematically showing the state of the fuel vapor of the mass Qfin shown in FIG. 3A at a certain time after the injection (at a certain post injection time t).

As shown in FIG. 3B, after being injected at the fuel injection start timing CAinj (that is, the post injection time t=0), the fuel vapor of the mass Qfin disperses conically at a spray angle θ while mixing with cylinder interior gas. Here, it is assumed that at an arbitrary post injection time t, the fuel vapor of the mass Qfin mixes with the cylinder interior gas of a mass G, which is a function of the post injection time t, and forms a gas mixture having a mass (Qfin+G) (hereinafter, the cylinder interior gas may be referred to as the "gas-mixture forming cylinder interior gas").

The present apparatus estimates the soot concentration (soot generation amount) within the gas mixture at an arbitrary post injection time t by means of calculating the generation speed of soot generated in the gas mixture (specifically, the rate of change of the soot concentration in the gas mixture) at minute time intervals Δt from the time when the post injection time t=0, and integrating (accumulating) the respective values of the generation speed with respect to time. First, a reaction model used for such estimation will be described.

<Estimation of Soot Generation Amount by Use of a Reaction Model Involving Generation of a Precursor of Soot>

Recently, studies on the soot formation mechanism have gradually come to elucidate the reaction process in which soot is generated from fuel via a precursor P of soot. In the present embodiment, the precursor P is defined to be any monomer, such as PAH, aromatic intermediate, saturated polymer, or $C_2H_2$, which can grow to soot through aggregation; and soot is defined to be a polymer formed through aggregation of two or more molecules of the precursor P, which is a monomer.

Figure 4:
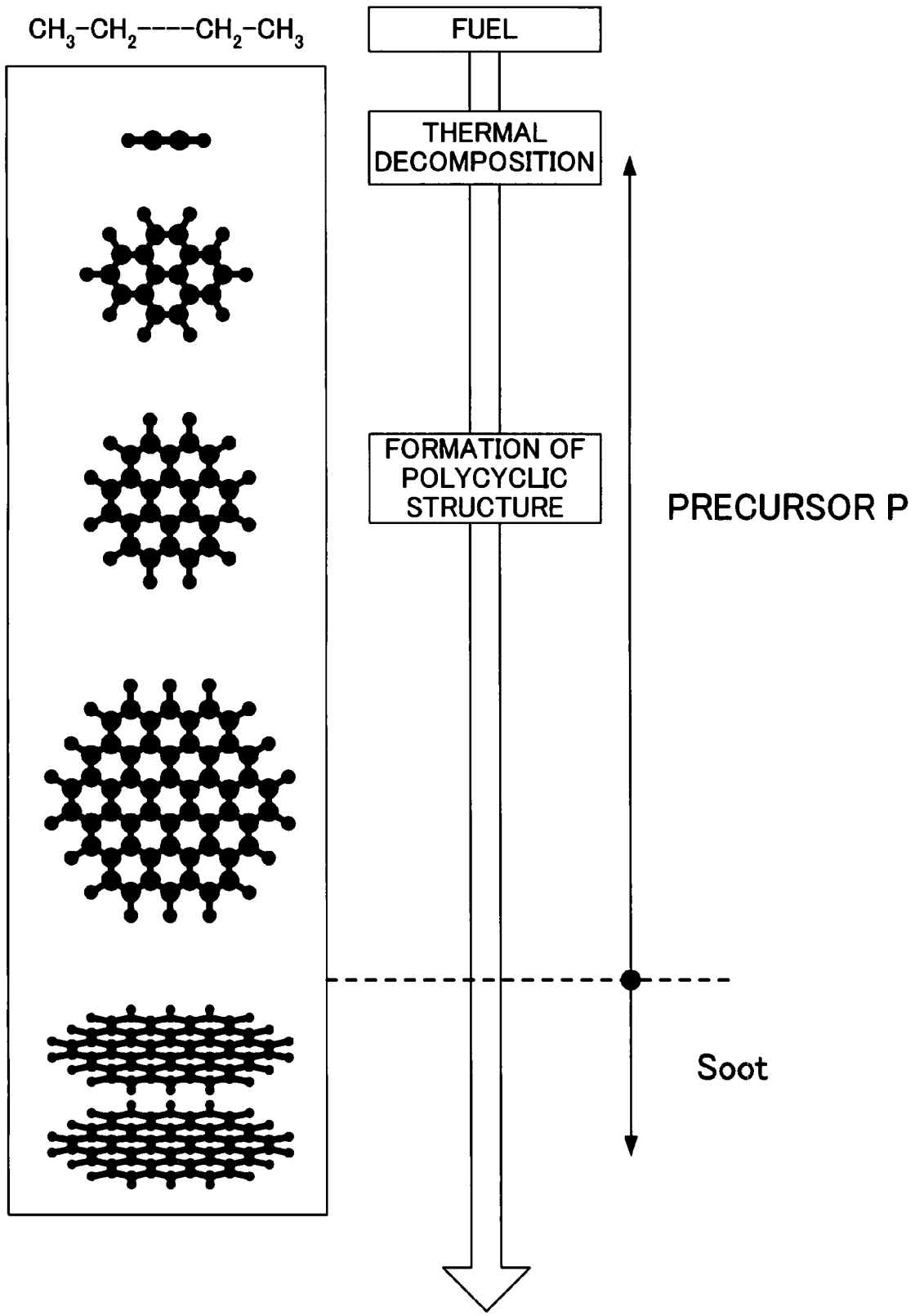
FIG. 4 is a diagram schematically showing a reaction process in which soot is generated from fuel via a precursor for an example case where the precursor is PAH (polycyclic aromatic hydrocarbon.

FIG. 4 is a diagram schematically showing a reaction process in which soot is generated from fuel via a precursor P for an example case where the precursor P is PAH (polycyclic aromatic hydrocarbon). As shown in FIG. 4, in this reaction process, fuel molecules first become a precursor P, which is a monomer, through a thermal decomposition reaction, etc.

After that, particles of the precursor P grow through, for example, a polycyclic structure forming reaction. When the molecular weight of the precursor P reaches a certain value, the intermolecular attraction of the precursor P increases, and aggregation (specifically, formation of clusters, formation of a chained configuration, or the like) occurs, whereby soot, which is a polymer, is generated. Notably, in general, when the number of carbon atoms contained in the molecules of the growing precursor P reaches about 100, the above-mentioned aggregation tends to occur.

Figure 5:
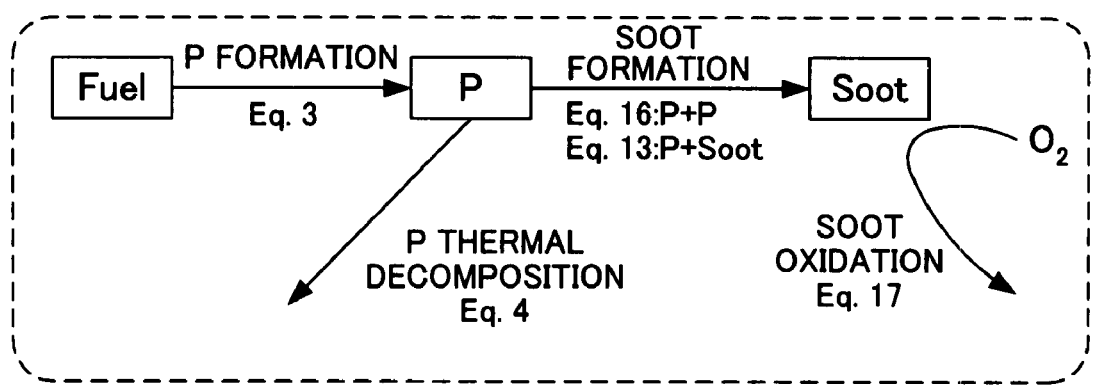
FIG. 5 is a diagram showing a reaction model which the soot generation amount estimation apparatus of FIG. 1 uses and in which a precursor is generated in the course of a reaction process in which soot is generated from fuel.
Figure 6:
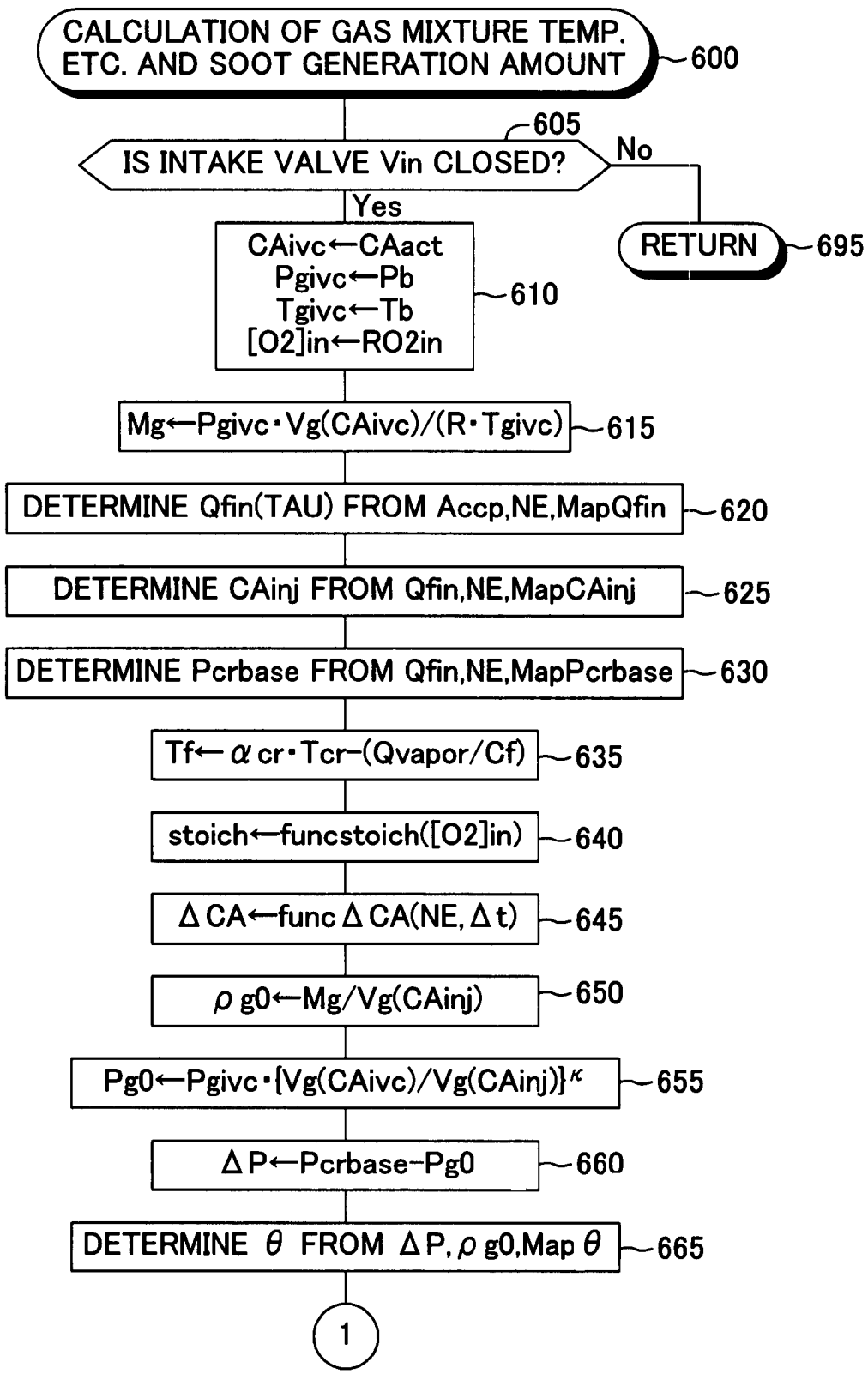
FIG. 6 is a flowchart showing a first portion of a routine which the CPU shown in FIG. 1 executes so as to calculate gas mixture temperature, etc. and soot generation amount.

In view of the above, for estimation of the above-described soot concentration, the present apparatus uses a reaction model shown in FIG. 5 in which a precursor P is generated in the course of a reaction process in which soot is generated from fuel. This reaction model will now be described. Notably, in the following description, "concentration" refers to "concentration by mass."

As shown in FIG. 5, in this reaction model, formation of a precursor P from fuel, thermal decomposition of the formed precursor P, formation of soot from the formed precursor P, and oxidation of the formed soot are taken into consideration. The formation of the precursor P from fuel increases the rate of change of the precursor P concentration [P]mix within the gas mixture (hereinafter, the rate of change is referred to as the "precursor P generation speed d[P]mix/dt"). Meanwhile, thermal decomposition of the formed precursor P and formation of soot from the formed precursor P decrease the precursor P generation speed d[P]mix/dt. Accordingly, in this reaction model, the precursor P generation speed d[P]mix/dt can be represented by the flowing Eq. 1.

$$d[P]\text{mix}/dt = dmpf/dt - dmpd/dt - dmsf/dt \qquad (1)$$

In Eq. 1, dmpf/dt represents a speed at which the precursor P concentration [P]mix within the gas mixture increases because of formation of the precursor P from fuel (hereinafter, this speed will be referred to as the "precursor P formation speed"); dmpd/dt represents a speed at which the precursor P concentration [P]mix within the gas mixture decreases because of thermal decomposition of the formed precursor P (hereinafter, this speed will be referred to as the "precursor P decomposition speed"); and dmsf/dt represents a speed at which the soot concentration [Soot]mix within the gas mixer increases because of formation of soot from the formed precursor P (in other words, a speed at which the precursor P concentration [P]mix within the gas mixture decreases (hereinafter, this speed will be referred to as the "soot formation speed")).

The formation of soot from the formed precursor P increases the rate of change of the soot concentration [Soot] mix within the gas mixture (hereinafter, the rate of change is referred to as the "soot generation speed d[Soot]mix/dt"). Meanwhile, oxidation of the formed soot decreases the soot generation speed d[Soot]mix/dt. Accordingly, in this reaction mode, the soot generation speed d[Soot]mix/dt can be represented by the following Eq. 2.

$$d[Soot]mix/dt = dmsf/dt - dmso/dt \qquad (2)$$

In Eq. 2, dmsf/dt represents the above-described soot formation speed; dmso/dt represents a speed at which the soot concentration [Soot]mix within the gas mixer decreases because of oxidation of the formed soot (hereinafter, this speed will be referred to as the "soot oxidation speed"). The terms of the right side of Eq. 1 and the terms of the right side of Eq. 2 will now be described.

<<Obtainment of the Precursor P Formation Speed>>

The precursor P formation speed dmpf/dt, which is the first term of the right side of Eq. 1, can be obtained in accordance with the following Eq. 3, which is based on a so-called Arrhenius equation used for calculation of reaction speed of a gas phase reaction, because the formation of the precursor P from fuel can be considered as a gas phase reaction.

$$dmpf/dt = Apf \cdot [Fuel]mix \cdot Pg^{\alpha pf} \cdot \exp(-Epf/(R \cdot Tmix)) \qquad (3)$$

In Eq. 3, Apf and apf are constants, Epf represents activation energy (constant), and R represents a gas constant (constant; this applies to the following description). [Fuel]mix represents fuel concentration within the gas mixture (this applies to the following description); Pg represents pressure of cylinder interior gas (this applies to the following description); and Tmix represents temperature of the gas mixture (this applies to the following description). These values can be obtained at minute time intervals Δt from the time when post injection time t=0, as will be described later. By virtue of the above described procedure, the precursor P formation speed dmpf/dt also can be obtained in accordance with Eq. 3 at the minute time intervals Δt from the time when post injection time t=0.

<<Obtainment of the Precursor P Decomposition Speed>>

The precursor P decomposition speed dmpd/dt, which is the second term of the right side of Eq. 1, can be obtained in accordance with the following Eq. 4, which is based on the Arrhenius equation as in the case of Eq. 3, because thermal decomposition of the formed precursor P can be considered as a gas phase reaction.

$$dmpd/dt = Apd \cdot [P]mix \cdot Pg^{\alpha pd} \cdot \exp(-Epd/(R \cdot Tmix)) \qquad (4)$$

In Eq. 4, Apd and apd are constants, and Epd represents activation energy (constant). [P]mix represents precursor P concentration within the gas mixture, which can be obtained at minute time intervals Δt from the time when post injection time t=0, through processing of integrating (accumulating), with respect to time, the precursor P generation speed d[P]mix/dt, which can be obtained in accordance with Eq. 1 at the minute time intervals Δt from the time when the post injection time t=0. By virtue of the above described procedure, the precursor P decomposition speed dmpd/dt also can be obtained in accordance with Eq. 4 at the minute time intervals Δt from the time when the post injection time t=0.

<<Obtainment of the Soot Formation Speed>>

The soot formation speed dmsf/dt, which is the third term of the right side of Eq. 1, can be obtained in accordance with the following Eq. 5. In Eq. 5, dmsfpp/dt represents a speed at which soot is formed because of mutual collision of molecules of the precursor P (hereinafter, this speed will be referred to as the "first soot formation speed"); and dmsfps/dt represents a speed at which soot is formed because of collision between molecules of the precursor P and molecules of soot (hereinafter, this speed will be referred to as the "second soot formation speed").

$$dmsf/dt = dmsfpp/dt + dmsfps/dt \qquad (5)$$

As described above, in this reaction model, the soot formation speed dmsf/dt is calculated in consideration of formation of soot caused by mutual collision of molecules of the precursor P and formation of soot caused by collision between molecules of the precursor P and molecules of soot after formation of soot, these soot formations occurring in a reaction process in which soot is formed from the precursor.

Formation of soot from the precursor P is a reaction associated with particles having a relatively large molecular weight. Accordingly, formation of soot from the precursor P is difficult to consider as a gas phase reaction. In this reaction model, the first soot formation speed dmsfpp/dt, which is the first term of the right side of Eq. 5, and the second soot formation speed dmsfps/dt, which is the second term of the right side of Eq. 5, are obtained as follows.

In general, the speed of aggregation of particles a and b because of collision therebetween can be represented by the product of the "number of collisions" between the particles a and b in a gas (e.g., a gas mixture) (the number of collisions per unit mass of the gas) and the probability at which the collided particles a and b aggregate (hereinafter referred to as the "aggregation probability").

Further, in general, the "number of collisions" between the particles a and b in a gas can be represented by the product of a "relative speed" between the particles a and b, a "collision cross section," which is an area associated with collision between the particles a and b, a "particle number density" of the particle a (which is the particle number of the particle a per unit mass of the gas), and a "particle number density" of the particle b (which is the particle number of the particle b per unit mass of the gas). The "collision cross section" is the area of a circle whose radius is equal to the sum of the radius of the particle a and the radius of the particle b, and can be represented by the following Eq. 6. Here, Da and Db represent the diameters of the particles a and b, respectively (this applies to the following description).

$$\text{Collision cross section} = \pi \cdot \left(\frac{Da + Db}{2}\right)^2 \qquad (6)$$

The "particle number density" is a value obtained by dividing the concentration of particles in the gas by the mass of a single particle. Accordingly, the "particle number density" of the particle a is "Ma/ma," and the "particle number density" of the particle b is "Mb/mb." Here, Ma and Mb represent the concentrations of the particles a and b in the gas, respectively; and ma and mb represent the single-particle masses of the particles a and b (this also applies to the following description). When the single-particle densities of the particles a and b are represented by ρa and ρb, respectively, the "particle number density" of the particle a can be represented as "(6·Ma)/(ρa·π·Da³)," and the "particle number density" of the particle b can be represented as "(6·Mb)/(ρb·π·Db³)."

The "relative speed" between the particles a and b can be represented by the following Eq. 7, by making use of the distribution function of Maxwell-Boltzmann. In Eq. 7, μ represents the reduced mass of the particles a and b (μ=(ma·mb)/(ma+mb). k represents the Boltzmann constant; and T represents the temperature of the gas.

$$\text{Relative speed} = \sqrt{\frac{8 \cdot k \cdot T}{\pi \cdot \mu}} \qquad (7)$$

Accordingly, the "number of collisions" between the particles a and b in the gas can be represented by the following Eq. 8.

$$\text{Number of collisions} = \qquad (8)$$
$$\sqrt{\frac{8 \cdot k \cdot T}{\pi \cdot \mu}} \cdot \pi \cdot \left(\frac{Da + Db}{2}\right)^2 \cdot \left(\frac{6 \cdot Ma}{\rho a \cdot \pi \cdot Da^3}\right) \cdot \left(\frac{6 \cdot Mb}{\rho b \cdot \pi \cdot Db^3}\right)$$

From the above, when the above-described aggregation probability with which the collided particles a and b aggregate is presented by A1 with a coefficient A2 defined as shown in the following Eq. 9, the speed of aggregation caused by collision between the particles a and b can be generally represented by the following Eq. 10.

$$A2 = \sqrt{\frac{8 \cdot k}{\pi \cdot \mu}} \cdot \pi \cdot \left(\frac{Da + Db}{2}\right)^2 \cdot \left(\frac{6}{\rho a \cdot \pi \cdot Da^3}\right) \cdot \left(\frac{6}{\rho b \cdot \pi \cdot Db^3}\right) \qquad (9)$$

$$\text{Aggregation speed} = A1 \cdot A2 \cdot Ma \cdot Mb \cdot \sqrt{T} \qquad (10)$$

The above-described first soot formation speed dmsfpp/dt is the speed of aggregation caused by mutual collision of molecules of the precursor P; and the above-described second soot formation speed dmsfps/dt is the speed of aggregation caused by collision of between molecules of the precursor P and molecules of soot. Accordingly, in this reaction model, the first soot formation speed dmsfpp/dt and the second soot formation speed dmsfps/dt are obtained through use of Eq. 10.

First, the second soot formation speed dmsfps/dt will be described. In this case, the particle a is considered to correspond to a particle of the precursor P and the particle b is considered to correspond to a particle of soot. In this case, the second soot formation speed dmsfps/dt can be obtained in accordance with the following Eq. 11, which corresponds to Eq. 10. In Eq. 11, Asfps1 represents an aggregation probability at which collided particles of the precursor P and soot aggregate; and Asfps2 is a coefficient defined as shown in the following Eq. 12, and corresponding to the above-mentioned coefficient A2.

$$\frac{dmsfps}{dt} = Asfps1 \cdot Asfps2 \cdot [P]\text{mix} \cdot [\text{Soot}]\text{mix} \cdot \sqrt{Tmix} \qquad (11)$$

$$Asfps2 = \qquad (12)$$
$$\sqrt{\frac{8 \cdot k}{\pi \cdot \mu ps}} \cdot \pi \cdot \left(\frac{Dp + Dsoot}{2}\right)^2 \cdot \left(\frac{6}{\rho p \cdot \pi \cdot Dp^3}\right) \cdot \left(\frac{6}{\rho soot \cdot \pi \cdot Dsoot^3}\right)$$

In Eq. 12, $\mu ps$ is the reduced mass of a single particle of the precursor P and a single particle of soot, and is represented by $\mu ps = (mp \cdot msoot)/(mp + msoot)$. mp and msoot represent the masses of a single particle of the precursor P and a single particle of soot, respectively, (this applies to the following description). Dp and Dsoot represent the diameters of a single particle of the precursor P and a single particle of soot, respectively, (this applies to the following description). $\rho p$ and $\rho soot$ represent the densities of a single particle of the precursor P and a single particle of soot, respectively, (this applies to the following description).

In this reaction model, mp, msoot, Dp, Dsoot, $\rho p$, and $\rho soot$ are all assumed to be constant. Accordingly, as can be understood from Eq. 12, the above-mentioned coefficient Asfps2 becomes a constant value. Further, the above-mentioned aggregation probability Asfps1 is also assumed to be constant. Moreover, in this model, the influence, on the second soot formation speed, of collision of particles other than the precursor P and soot is taken into consideration, and therefore, a term "$Pg^{\alpha sfps}$" depending on the cylinder interior gas pressure Pg is added as a factor of the right side of Eq. 11 ($\alpha sfps$ is a constant). That is, in this model, when the product of the coefficient Asfps2 and the aggregation probability Asfps1 is replaced with a coefficient Asfps (constant), the second soot formation speed dmsfps/dt can be obtained in accordance with the following Eq. 13.

$$dmsfps/dt = Asfps \cdot [P]\text{mix} \cdot [\text{Soot}]\text{mix} \cdot Pg^{\alpha sfps} \cdot \sqrt{Tmix} \qquad (13)$$

As described above, the precursor P concentration [P]mix within the gas mixture, the cylinder interior gas pressure Pg, and the gas mixture temperature Tmix in Eq. 13 can be obtained at the minute time intervals $\Delta t$ from the time when the post injection time t=0. Further, as will be described later, the soot concentration [Soot]mix within the gas mixture can be obtained at the minute time intervals $\Delta t$ from the time when the post injection time t=0. Therefore, the second soot formation speed dmsfps/dt can be obtained in accordance with Eq. 13 at the minute time intervals $\Delta t$ from the time when the post injection time t=0.

As described above, in this reaction model, the second soot formation speed dmsfps/dt is calculated in consideration of the number of collisions between particles of the precursor P and particles of soot and the above-mentioned aggregation probability Asfps1 at which collided particles of the precursor P and those of soot aggregate. In other words, the second soot formation speed dmsfps/dt is calculated in consideration of a probability at which new particles of soot are formed because of collision between particles of the precursor P and those of soot. In addition, the "number of collisions between particles of the precursor P and particles of soot" is calculated on the basis of the precursor P concentration [P]mix within the gas mixture, the soot concentration [Soot]mix within the gas mixture, and the gas mixture temperature Tmix.

Next, the first soot formation speed dmsfpp/dt will be described. In this case, the particles a and b are considered to correspond to particles of the precursor P. Thus, the reduced mass $\mu$ can be represented as follows:

$$\mu = mp/2 = (\rho p \cdot \pi \cdot Dp^3)/6 \cdot (1/2).$$

Further, in this case, because of the assumption that particles of the same type collide with one another, a single collision phenomenon is counted as two collisions. That is, the "number of collisions" among particles of the precursor P becomes equal to a value obtained by multiplying the value obtained from the above-described Eq. 8 by (½).

When the above-described factors are taken into consideration, the first soot formation speed dmsfpp/dt can be obtained in accordance with the following Eq. 14, which corresponds to Eq. 10. In Eq. 14, Asfpp1 represents an aggregation probability at which collided particles of the precursor P aggregate; and Asfpp2 is a coefficient defined as shown in the following Eq. 15, and corresponding to the above-mentioned coefficient A2.

$$\frac{dmsfpp}{dt} = Asfpp1 \cdot Asfpp2 \cdot [P]mix^2 \cdot \sqrt{Tmix} \quad (14)$$

$$Asfpp2 = \frac{1}{\sqrt{2}} \cdot \sqrt{\frac{8 \cdot k}{\pi} \cdot \frac{6}{\rho p \cdot \pi \cdot Dp^3}} \cdot \pi \cdot Dp^2 \cdot \left(\frac{6}{\rho p \cdot \pi \cdot Dp^3}\right)^2 \quad (15)$$

In this reaction model, Dp and ρp are assumed to be constant. Accordingly, as can be understood from Eq. 15, the above-mentioned coefficient Asfpp2 becomes a constant value. Further, the above-mentioned aggregation probability Asfpp1 is also assumed to be constant. Moreover, in this model, the influence, on the first soot formation speed, of collision of particles other than the precursor P is taken into consideration, and therefore, a term "$Pg^{\alpha sfpp}$" depending on the cylinder interior gas pressure Pg is added as a factor of the right side of Eq. 14 (asfpp is a constant). That is, in this model, when the product of the coefficient Asfpp2 and the aggregation probability Asfpp1 is replaced with a coefficient Asfpp (constant), the first soot formation speed dmsfpp/dt can be obtained in accordance with the following Eq. 16.

$$dmsfpp/dt = Asfpp \cdot [P]mix^2 \cdot Pg^{\alpha sfpp} \sqrt{Tmix} \quad (16)$$

As described above, the precursor P concentration [P]mix within the gas mixture, the cylinder interior gas pressure Pg, and the gas mixture temperature Tmix in Eq. 16 can be obtained at the minute time intervals Δt from the time when the post injection time t=0. Therefore, the first soot formation speed dmsfpp/dt can be obtained in accordance with Eq. 16 at the minute time intervals Δt from the time when the post injection time t=0.

As described above, in this reaction model, the first soot formation speed dmsfpp/dt is calculated in consideration of the number of collisions among particles of the precursor P and the above-mentioned aggregation probability Asfpp1 at which collided particles of the precursor P aggregate. In other words, the first soot formation speed dmsfpp/dt is calculated in consideration of a probability at which particles of soot are formed because of collision among particles of the precursor P. In addition, the "number of collisions among particles of the precursor P" is calculated on the basis of the precursor P concentration [P]mix within the gas mixture and the gas mixture temperature Tmix.

The above-mentioned "aggregation probability Asfps1 at which collided particles of the precursor P and those of soot aggregate" is greater than the above-mentioned "aggregation probability Asfpp1 at which collided particles of the precursor P aggregate," because the mass of each molecule of soot, which is a polymer, is greater than that of each molecule of the precursor, which is a monomer; i.e., the intermolecular attraction between molecules of the precursor P and those of soot is greater than that among molecules of the precursor P.

As described above, since the first soot formation speed dmsfpp/dt and the second soot formation speed dmsfps/dt can be obtained at the minute time intervals Δt from the time when the post injection time t=0, the soot formation speed dmsf/dt, which is the third term of the right side of the above-described Eq. 1, can be obtained in accordance with the above-described Eq. 5 at the minute time intervals Δt from the time when the post injection time t=0.

<<Obtainment of Precursor P Concentration>>

Since the all the terms of the right side of the above-described Eq. 1 can be obtained at the minute time intervals Δt from the time when the post injection time t=0, the precursor P generation speed d[P]mix/dt can be obtained in accordance with the above-described Eq. 1 at the minute time intervals Δt from the time when the post injection time t=0. Therefore, the precursor P concentration [P]mix within the gas mixture at any post injection time t can be estimated by means of integrating (accumulating), with respect to time, the precursor P generation speed d[P]mix/dt in each of the minute time intervals Δt.

Next, the terms of the right side of the above-described Eq. 2 will be described. The soot formation speed dmsf/dt, which is the first term of the right side of Eq. 2 is the same as the soot formation speed dmsf/dt of the third term of the right side of the above-described Eq. 1, and can be obtained in accordance with the above-described Eq. 5 at the minute time intervals Δt from the time when the post injection time t=0.

<<Obtainment of Soot Oxidation Speed>>

In this reaction model, the soot oxidation speed dmso/dt, which is the second term of the right side of Eq. 2, is obtained in accordance with the following Eq. 17, which is an experimental formula disclosed in "Combustion Model of Direct-Injection-Type Diesel Engine and Performance Prediction," the Transactions of the Japanese Society of Mechanical Engineers (book B), vol. 48, No. 432.

$$dmso/dt = Aso \cdot [Soot]mix \cdot [O2]mix \cdot Pg^{\alpha so} \cdot \exp(-Eso/(R \cdot Tmix)) \quad (17)$$

In Eq. 17, Aso and aso are constants, and Eso represents activation energy (constant). [O2]mix represents oxygen concentration within the gas mixture (this applies to the following description), and can be obtained at minute time intervals Δt from the time when the post injection time t=0, as will be described later. By virtue of the above described procedure, the soot oxidation speed dmso/dt also can be obtained in accordance with Eq. 17 at the minute time intervals Δt from the time when the post injection time t=0.

<<Obtainment of Soot Concentration>>

Since the all the terms of the right side of the above-described Eq. 2 can be obtained at the minute time intervals Δt from the time when the post injection time t=0, the soot generation speed d[Soot]mix/dt can be obtained in accordance with the above-described Eq. 2 at the minute time intervals Δt from the time when the post injection time t=0. Therefore, the soot concentration [Soot]mix within the gas mixture at any the post injection time t can be estimated by means of integrating (accumulating), with respect to time, the soot generation speed d[Soot]mix/dt in each of the minute time intervals Δt.

Moreover, if the soot concentration [Soot]mix within the gas mixture at the post injection time t can be estimated in this manner, a soot generation mass at the post injection time t (hereinafter referred to as the "soot generation mass Sootnew") can be obtained by multiplying the value of the soot concentration [Soot]mix within the gas mixture by the value of the gas mixture mass Mmix.

As described above, in the reaction model used by the present apparatus, the soot generation speed d[Soot]mix/dt is calculated on the basis of the precursor P generation speed d[P]mix/dt (i.e., the precursor P concentration [P]mix within the gas mixture; the generation amount of the precursor), and the calculated soot generation speed d[Soot]mix/dt is integrated with respect to time to thereby estimate the soot concentration [Soot]mix within the gas mixture (the generation amount of soot).

As described above, the reaction process in which soot is generated from fuel is divided into two reaction processes; i.e., a reaction process in which the precursor P is generated from fuel and a reaction process in which soot is generated from the precursor P. Therefore, the following advantageous effects can be obtained.

The precursor P concentration [P]mix first increases upon generation of the precursor P from fuel. Subsequently, as the precursor P concentration [P]mix increases, the soot concentration [Soot]mix increases. Therefore, the reaction model can accurately simulate a "delay in soot generation (reaction)," which is experimentally or empirically known to occur in a reaction process in which soot is generated from fuel.

When the precursor P generation speed d[P]mix/dt is calculated in accordance with the above-described Eq. 1, the precursor P decomposition speed dmpd/dt, which is obtained in accordance with the above-described Eq. 4, is taken into consideration. This precursor P decomposition speed dmpd/dt increases with the gas mixture temperature Tmix. Accordingly, the higher the gas mixture temperature Tmix, the greater the degree to which the precursor P generation speed d[P]mix/dt (i.e., the precursor P concentration [P]mix) decreases. Therefore, the reaction model can accurately simulate a "phenomenon in which the soot generation speed decreases as the gas mixture temperature increases when the gas mixture temperature exceeds a certain temperature," which phenomenon is experimentally or empirically known.

In the above, there has been described a method for estimating the soot generation amount (soot concentration [Soot] mix within the gas mixture) by making use of a reaction model involving generation of a precursor. Next, a method for estimating the gas mixture temperature Tmix, the fuel concentration [Fuel]mix within the gas mixture, the oxygen concentration [O2]mix within the gas mixture, and the cylinder interior gas pressure Pg, which are necessary for estimation of the soot concentration [Soot]mix, will be described. First, a method for obtaining an excess air factor λ at an arbitrary post injection time t, which is required to estimate these physical values, will be described.

<Obtainment of Excess Air Factor λ>

An excess air factor λ at an arbitrary post injection time t is defined as shown in the following Eq. 18. In Eq. 18, stoich represents a mass of the cylinder interior gas necessary for combustion of fuel of a unit mass (hereinafter referred to as the "cylinder interior gas stoichiometric air-fuel ratio stoich"). Since the cylinder interior gas stoichiometric air-fuel ratio stoich is considered to change in accordance with the concentration of oxygen contained in the intake gas, the cylinder interior gas stoichiometric air-fuel ratio stoich can be obtained as a predetermined function in which the above-described intake-gas oxygen concentration RO2in is used as an argument. Further, as described above, G represents the mass of the gas-mixture-forming cylinder interior gas, and Qfin represents the instruction fuel injection quantity (mass) (see FIG. 3).

$$\lambda = \left(\frac{1}{stoich}\right) \cdot \frac{G}{Qfin} \tag{18}$$

The excess air factor λ defined as described above can be obtained as a function of the post injection time t on the basis of, for example, the following Eqs. 19 and 20, which are empirical formulas introduced in "Study on Injected Fuel Travel Distance in Diesel Engine," Yutaro WAGURI, Masaru FUJII, Tatsuo AMIYA, and Reijiro TSUNEYA, the Transactions of the Japanese Society of Mechanical Engineers, p 820, 25-156 (1959).

$$\lambda = \int \frac{d\lambda}{dt} dt \tag{19}$$

$$\frac{d\lambda}{dt} = \frac{2^{0.25}}{c^{0.25} \cdot d^{0.5} \cdot \rho_f} \cdot \frac{1}{L} \cdot \tan^{0.5}\theta \cdot \rho g^{0.25} \cdot \Delta P^{0.25} \cdot \frac{1}{t^{0.5}} \tag{20}$$

In Eq. 20, t represents the above-mentioned post injection time, and dλ/dt represents fuel dilution ratio, which is a function of the post injection time t. Further, c represents a contraction coefficient, d represents the diameter of the injection opening of the fuel injection valves 21, pf represents the density of (liquid) fuel, and L represents a theoretical dilution gas quantity, all of which are constants.

In Eq. 20, ΔP represents effective injection pressure, which is a value obtained through subtraction, from the above-mentioned final fuel injection pressure Pcrfin, of cylinder interior gas pressure Pg0 at the injection start timing (i.e., the post injection time t=0). The cylinder interior gas pressure Pg0 can be obtained in accordance with the following Eq. 21 under the assumption that the state of the cylinder interior gas changes adiabatically in the compression stroke (and expansion stroke) after the intake valve Vin closes (that is, the point in time at which the cylinder interior gas is confined; hereinafter referred to as "IVC").

$$Pg0 = Pgivc \cdot \left\{\frac{Vg(CAivc)}{Vg(CAinj)}\right\}^\kappa \tag{21}$$

In Eq. 21, Pgivc is a cylinder interior gas pressure at IVC. As described above, IVC is in the vicinity of the compression bottom dead center, and therefore, the cylinder interior gas pressure is considered to be substantially equal to the intake pipe pressure Pb at IVC. Accordingly, the intake pipe pressure Pb detected by means of the intake pipe pressure sensor 73 at IVC can be used as Pgivc. Vg(CAivc) represents a cylinder interior volume corresponding to a crank angle CA at IVC. Vg(CAinj) represents a cylinder interior volume corresponding to a crank angle CA at the time when the post injection time t=0. Since cylinder interior volume Vg can be obtained as a function Vg(CA) of the crank angle CA on the basis of the design specifications of the engine 10, the values of Vg(CAivc) and Vg(CAinj) can be obtained as well. κ represents the specific heat ratio (in the present example, a constant value) of the cylinder interior gas.

In Equation (20), θ represents the spray angle shown in FIG. 3B. Since the spray angle θ is considered to change in accordance with the above-mentioned effective injection pressure ΔP and the density ρg0 of the cylinder interior gas at the injection start timing (i.e., the post injection time t=0), the spray angle θ can be obtained on the basis of a table Mapθ, which defines the relation between cylinder interior gas density ρg0 and effective injection pressure ΔP, and spray angle θ. The cylinder interior gas density ρg0 can be obtained through division of the total mass Mg of the cylinder interior gas by the above-mentioned cylinder interior volume Vg(CAinj) at the time when the post injection time t=0. The total mass Mg of the cylinder interior gas can be obtained in accordance with the following Eq. 22, which is based on the state equation of gas at IVC. In Eq. 22, Tgivc represents cylinder interior gas temperature at IVC. Since IVC is near the compression bottom dead center, the cylinder interior gas temperature is considered to be substantially equal to the intake-gas temperature Tb at IVC. Accordingly, the intake-gas temperature Tb detected by means of the intake-gas temperature sensor 72 at IVC can be used as Tgivc. R represents the gas constant (in the present example, constant value) of the cylinder interior gas.

$$Mg = Pgivc \cdot \frac{Vg(CAivc)}{R \cdot Tgivc} \quad (22)$$

In Eq. 20, ρg represents the density of the cylinder interior gas at the post injection time t, and can be obtained as a function of the post injection time t through division of the total mass Mg of the cylinder interior gas by the above-mentioned cylinder interior volume Vg(CA) at the post injection time t.

As is apparent from the above, once the effective injection pressure ΔP and the spray angle θ are obtained in the above-described manner, the fuel dilution ratio dλ/dt is obtained, as a function of the post injection time t, in accordance with Eq. 20, by making use of the value of the post injection time t and the value of the cylinder interior gas density ρg, which is a function of the post injection time t. The values of fuel dilution ratio dλ/dt, which are obtained at the minute time intervals Δt (e.g., 0.1 msec) from the time when the post injection time t=0, are integrated with respect to time in accordance with Eq. 19, whereby the excess air factor λ at the post injection time t can be obtained at the minute time intervals Δt from the time when the post injection time t=0.

Since the fuel dilution ratio dλ/dt obtained from Eq. 20 always assumes a positive value, the excess air factor λ obtained from Eq. 19 increases with the post injection time t. Therefore, as can be understood from Eq. 18, the mass G of the gas-mixture-forming cylinder interior gas increases with the post injection time t. This coincides with the fact that as vapor of the injected fuel disperses conically, an increasing quantity of the cylinder interior gas (i.e., gas-mixture-forming cylinder interior gas) is mixed with the fuel vapor.

<Obtainment of Gas Mixture Temperature Tmix>

Next, there will be described a method for obtaining the gas mixture temperature Tmix at an arbitrary post injection time t by making use of the value of the excess air factor λ obtained in the above-described manner. In general, the thermal energy (enthalpy) Hmix of a gas mixture can be represented by the following Eq. 23 by use of the gas mixture temperature Tmix.

$$Hmix = Mmix \cdot Cmix \cdot Tmix \quad (23)$$

In Eq. 23, Mmix represents the total mass of the gas mixture (gas mixture mass), Cmix represents the specific heat at constant pressure of the gas mixture. Therefore, the gas mixture temperature Tmix can be obtained in accordance with the following Eq. 24 at the minute time intervals Δt from the time when the post injection time t=0, by obtaining (updating) the enthalpy Hmix of the gas mixture, the gas mixture mass Mmix, the constant-pressure specific heat Cmix of the gas mixture at the minute time intervals Δt from the time when the post injection time t=0. First, a method for obtaining the gas mixture mass Mmix will be described.

$$Tmix = \frac{Hmix}{Mmix \cdot Cmix} \quad (24)$$

<<Gas Mixture Mass Mmix>>

As described above, the fuel vapor of the mass Qfin mixes with the gas-mixture-forming cylinder interior gas of the mass G at a certain post injection time t to thereby form a gas mixture having a mass (Qfin+G). Therefore, the gas mixture mass Mmix at the certain post injection time t is (Qfin+G). Since the equation "G=stoich·λ·Qfin" is obtained from the above-described Eq. 18, the gas mixture mass Mmix can be represented by the following Eq. 25 by use of the excess air factor λ.

$$Mmix = (1 + \text{stoich} \cdot \lambda) \cdot Qfin \quad (25)$$

Accordingly, the gas mixture mass Mmix can be obtained at the minute time intervals Δt from the time when the post injection time t=0, by applying to Eq. 25 the values of the excess air factor λ obtained at the minute time intervals Δt from the time when the post injection time t=0.

<<Constant-Pressure Specific Heat Cmix of the Gas Mixture>>

Next, a method for obtaining the constant-pressure specific heat Cmix of the gas mixture will be described. In general, the constant-pressure specific heat Cmix of the gas mixture is considered to greatly depend on the oxygen concentration [O2]mix within the gas mixture and the gas mixture temperature Tmix. Here, the oxygen concentration [O2]mix within the gas mixture can be obtained at the minute time intervals Δt from the time when the post injection time t=0, as will be described later. Accordingly, if the gas mixture temperature Tmix can be obtained at the minute time intervals Δt from the time when the post injection time t=0, the constant-pressure specific heat Cmix of the gas mixture can be obtained in accordance with the following Eq. 26 at the minute time intervals Δt.

$$Cmix = \text{funcCmix}([O2]mix, Tmix) \quad (26)$$

In Eq. 26, funcCmix is a function for obtaining the constant-pressure specific heat Cmix of the gas mixture, while using the oxygen concentration [O2]mix of the gas mixture and the gas mixture temperature Tmix as arguments. Notably, the argument values of [O2]mix and Tmix for obtaining the constant-pressure specific heat Cmix of the gas mixture in accordance with Eq. 26 at the minute time intervals Δt are not those at the present point in time (that is, the past-injection time t), but those at a point in time which is prior to the present point time by the minute time interval Δt.

<<Enthalpy Hmix of the Gas Mixture>>

Next, a method for obtaining the enthalpy Hmix of the gas mixture will be described. Here, for the case where the enthalpy Hmix(t−Δt) of the gas mixture at the post injection time (t−Δt) is known, an enthalpy increase ΔHmix of the gas mixture during the minute time interval Δt between the post injection time (t−Δt) and the post injection time t will be considered. The enthalpy increase ΔHmix of the gas mixture is caused by the thermal energy ΔHg of a cylinder interior gas newly mixed with the gas mixture during the minute time interval Δt, and a reaction heat Hr generated as a result of chemical reactions occurring within the gas mixture during the minute time interval Δt.

First, the thermal energy ΔHg of the cylinder interior gas can be represented by the following Eq. 27. In Eq. 27, g represents the mass of the cylinder interior gas newly mixed with the gas mixture during the minute time interval Δt. This mass g is a value obtained by subtracting the mass of the gas-mixture-forming cylinder interior gas at the post injection time (t−Δt) from the mass of the gas-mixture-forming cylinder interior gas at the post injection time t. Accordingly, the mass g can be obtained in accordance with the following Eq. 28 by making use of the above-described relation ""G=stoich·λ·Qfin." In Eq. 28, λ(t) and λ(t−Δt) represent excess air factors at the post injection time (t−Δt) and the post injection time t, respectively, and can be obtained from the above-described Eqs. 19 and 20.

$$\Delta Hg = g \cdot Cg \cdot Tg \quad (27)$$

$$g = \text{stoich} \cdot (\lambda(t) - \lambda(t - \Delta t)) \cdot Q\text{fin} \quad (28)$$

In Eq. 27, Tg represents the temperature of the cylinder interior gas at the post injection time t, and can be obtained in accordance with the following Eq. 29 under the assumption that the state of the cylinder interior gas adiabatically changes after IVC. In Eq. 29, as described above, Tgivc represents the temperature of the cylinder interior gas at IVC, and Vg(CAivc) represents the cylinder interior volume corresponding to the crank angle CA at IVC. Further, Vg(CA) represents the cylinder interior volume Vg(CA) at the present point in time (that is, at the post injection time t).

$$Tg = Tgivc \cdot \left\{ \frac{Vg(CAivc)}{Vg(CA)} \right\}^{\kappa - 1} \quad (29)$$

In Eq. 27, Cg represents the constant-pressure specific heat of the cylinder interior gas at the post injection time t, and can be obtained in accordance with the following Eq. 30, which is similar to Eq. 26 for obtaining the constant-pressure specific heat Cmix of the gas mixture. In Eq. 30, funcCg is a function for obtaining the constant-pressure specific heat Cg of the cylinder interior gas, while using the oxygen concentration [O2]in within the intake gas and the cylinder interior gas temperature Tg as arguments.

$$Cg = \text{func}Cg([O2]\text{in}, Tg) \quad (30)$$

Notably, the intake-gas oxygen concentration RO2in detected by means of the intake-gas oxygen concentration sensor 77 is used as the argument value of [O2]in for obtaining the constant-pressure specific heat Cg of the cylinder interior gas in accordance with Eq. 30 at the minute time intervals Δt. Further, the argument value of the cylinder interior gas temperature Tg is that at the present point in time (that is, the past-injection time t). Since all the terms of the right side of Eq. 27 can be obtained through the above-described procedure, the thermal energy ΔHg of the cylinder interior gas can be obtained in accordance with Eq. 27.

Next, the reaction heat Hr generated as a result of chemical reactions occurring within the gas mixture during the minute time interval Δt can be represented by the following Eq. 31. In Eq. 31, Hf is a predetermined constant; and qr represents the quantity of fuel consumed as a result of the chemical reactions occurring within the gas mixture during the minute time interval Δt.

$$Hr = Hf \cdot qr \quad (31)$$

The chemical reactions affecting the fuel consumption quantity qr include not only formation of the precursor P, firing reaction (hot flame reaction) and low-temperature oxidation reaction (cold flame reaction) but also other various chemical reactions. Since the fuel consumption quantity qr can be considered to greatly depend on the oxygen concentration [O2]mix within the gas mixture, the fuel concentration [Fuel]mix within the gas mixture and the gas mixture temperature Tmix, the fuel consumption quantity qr can be represented by the following Eq. 32.

$$qr = \text{func}qr([O2]\text{mix}, [\text{Fuel}]\text{mix}, T\text{mix}) \quad (32)$$

In Eq. 32, funcqr is a function for obtaining the fuel consumption quantity qr, while using the oxygen concentration [O2]mix within the gas mixture, the fuel concentration [Fuel] mix within the gas mixture, and the gas mixture temperature Tmix as arguments. Notably, like the oxygen concentration [O2]mix within the gas mixture, the fuel concentration [Fuel] mix within the gas mixture can be obtained at the minute time intervals Δt from the time when the post injection time t=0, as will be described later. The argument values of [O2]mix and [Fuel]mix for obtaining the fuel consumption quantity qr in accordance with Eq. 32 at the minute time intervals Δt are not those at the present point in time (that is, the past-injection time t), but those at a point in time which is prior to the present point time by the minute time interval Δt.

Further, the gas mixture temperature Tpre before occurrence of the chemical reactions is used as the argument of the gas mixture temperature Tmix of Eq. 32. The gas mixture temperature Tpre before occurrence of the chemical reactions is a gas mixture temperature in a period after the cylinder interior gas of the mass g calculated in accordance with Eq. 28 is newly mixed with the gas mixture but before occurrence of chemical reactions during the minute time interval Δt from the post injection time (t−Δt), and can be calculated in accordance with the following Eq. 33.

$$Tpre = \frac{Hmix(t - \Delta t) + \Delta Hg}{(Mmix(t - \Delta t) + g) \cdot Cmix(t - \Delta t)} \quad (33)$$

In Eq. 33, Mmix(t−Δt) and Cmix(t−Δt) respectively represent the mass and constant-pressure specific heat of the gas mixture at the post injection time (t−Δt), and can be calculated in accordance with the above-described Eq. 25 and Eq. 26, respectively. The enthalpy Hmix(t−Δt) at the post injection time (t−Δt) is known. Therefore, the gas mixture temperature Tpre before occurrence of chemical reactions can be obtained. Accordingly, all the arguments of the right side of Eq. 32 can be obtained, and thus, the reaction heat Hr generated as a result of chemical reactions can be obtained in accordance with Eqs. 32 and 31.

By virtue of the above-described procedure, for the case where the enthalpy Hmix(t−Δt) of the gas mixture at the post injection time (t−Δt) is known, an enthalpy increase ΔHmix (=ΔHg+Hr) of the gas mixture during the period Δt between the post injection time (t−Δt) and the post injection time t can be obtained, whereby the enthalpy Hmix(t) (=Hmix(t−Δt)+ ΔHmix) of the gas mixture at the post injection time t can be obtained.

Moreover, when the post injection time t=0, the gas mixture is in a state before mixing with the cylinder interior gas (i.e., the gas mixture is composed of fuel vapor only) (see FIG. 3A). Therefore, the enthalpy Hmix(0) at that time can be obtained by the following Eq. 34. In Eq. 34, Cf represents the constant-pressure specific heat (which is constant in the present example) of fuel (vapor).

$$H\text{mix}(0) = Q\text{fin} \cdot Cf \cdot Tf \quad (34)$$

Further, Tf represents the temperature of fuel vapor itself, and can be obtained in accordance with the following Eq. 35 in consideration of latent heat Qvapor per unit mass at the time when liquid fuel changes fuel vapor immediately after injection. In Eq. 35, Tcr represents the temperature of the liquid fuel detected by means of the fuel temperature sensor 76 when the post injection time t=0. αcr is a correction coefficient for taking into consideration the thermal loss generated upon passage of the fuel through the fuel line 23 extending from the vicinity of the discharge port of the fuel injection pump 22 to the fuel injection valve 21.

$$Tf = \alpha cr \cdot Tcr - \frac{Qvapor}{Cf} \quad (35)$$

Accordingly, the enthalpy Hmix(0) of the gas mixture at the time when the post injection time t=0 can also obtained. With the above-described procedure, the enthalpy Hmix of the gas mixture can be obtained at the minute time intervals Δt from the time when the post injection time t=0.

Since the enthalpy Hmix of the gas mixture, the mass Mmix of the gas mixture, and the constant-pressure specific heat Cmix of the gas mixture are obtained at the minute time intervals Δt from the time when the post injection time t=0, the gas mixture temperature Tmix can be obtained in accordance with Eq. 24 at the minute time intervals Δt from the time when the post injection time t=0.

<Obtainment of the Fuel Concentration [Fuel]Mix Within the Gas Mixture>

Next, a method for obtaining the fuel concentration [Fuel]mix within the gas mixture will be described. The fuel concentration [Fuel]mix within the gas mixture at the post injection time t is a ratio of the "mass of fuel present within the gas mixture at the post injection time t" to the gas mixture mass Mmix at the post injection time t obtained in accordance with the above-described Eq. 25.

The "mass of fuel present within the gas mixture at the post injection time t" is a value obtained by subtracting the quantity of fuel consumed by chemical reactions during a period between the injection and the present point in time (post injection time t) from the quantity of fuel injected when the post injection time t=0 (instruction fuel injection quantity Qfin). Accordingly, the fuel concentration [Fuel]mix within the gas mixture at the post injection time t can be represented by the following Eq. 36.

$$[Fuel]mix = \frac{Qfin - \sum qr}{Mmix} \quad (36)$$

In Eq. 36, "Σqr" represents the sum of the values of the fuel consumption quantity qr obtained and updated in accordance with the above-described Eq. 32 at the minute time intervals Δt from the injection to the present point in time (post injection time t). In this manner, by means of obtaining the fuel consumption quantity qr and the gas mixture mass Mmix at the minute time intervals Δt from the time when the post injection time t=0, the fuel concentration [Fuel]mix within the gas mixture can be obtained in accordance with Eq. 36 at the minute time intervals Δt from the time when the post injection time t=0.

<Obtainment of the Oxygen Concentration [O2]Mix Within the Gas Mixture>

Next, a method for obtaining the oxygen concentration [O2]mix within the gas mixture will be described. The oxygen concentration [O2]mix within the gas mixture at the post injection time t is a ratio of the "mass of oxygen present within the gas mixture at the post injection time t" to the gas mixture mass Mmix at the post injection time t.

The "mass of cylinder interior gas present within the gas mixture at the post injection time t" is a value obtained by subtracting the quantity of cylinder interior gas consumed by chemical reactions during a period between the injection and the present point in time (post injection time t) from the mass G of the gas-mixture-forming cylinder interior gas at the post injection time t. The quantity gr of cylinder interior gas consumed in the minute time interval Δt as a result of reaction with fuel (fuel consumption quantity qr) in the minute time interval Δt can be represented by the following Eq. 37.

$$gr = stoich \cdot qr \quad (37)$$

Accordingly, the "mass of cylinder interior gas present within the gas mixture at the post injection time t" can be represented by "G−Σgr." Here, "Σgr" represents the sum of the values of the cylinder interior gas consumption quantity gr obtained and updated in accordance with the above-described Eq. 37 at the minute time intervals Δt from the injection to the present point in time (post injection time t).

The "mass of oxygen present within the gas mixture at the post injection time t" can be obtained by multiplying the "mass of cylinder interior gas present within the gas mixture at the post injection time t" by the oxygen concentration within the cylinder interior gas (accordingly, the above-described oxygen concentration [O2]in within the intake gas). Accordingly, the oxygen concentration [O2]mix within the gas mixture at the post injection time t can be represented by the following Eq. 38.

$$[O2]mix = \frac{(G - \sum gr) \cdot [O2]in}{Mmix} \quad (38)$$

In this manner, by means of obtaining the mass G of the gas-mixture-forming cylinder interior gas, the cylinder interior gas consumption quantity gr, and the gas mixture mass Mmix at the minute time intervals Δt from the time when the post injection time t=0, the oxygen concentration [O2]mix within the gas mixture can be obtained in accordance with Eq. 38 at the minute time intervals Δt from the time when the post injection time t=0.

<Obtainment of the Cylinder Interior Gas Pressure Pg>

Next, a method for obtaining the cylinder interior gas pressure Pg will be described. The cylinder interior gas pressure Pg can be obtained in accordance with the following Eq. 39 under the assumption that the state of the cylinder interior gas adiabatically changes after IVC. In Eq. 39, as described above, Pgivc represents the cylinder interior gas pressure at IVC, and Vg(CAivc) represents the cylinder interior volume corresponding to the crank angle CA at IVC. Further, Vg(CA) represents the cylinder interior volume Vg(CA) at the present point in time (that is, at the post injection time t). In the above, methods for estimating the excess air factor λ, the gas mixture temperature Tmix, the fuel concentration [Fuel]mix within the gas mixture, the oxygen concentration [O2]mix within the gas mixture, and the cylinder interior gas pressure Pg, which are necessary for estimation of the soot concentration [Soot] mix, have been described.

$$Pg = Pgivc \cdot \left\{ \frac{Vg(CAivc)}{Vg(CA)} \right\}^{\kappa} \quad (39)$$

Outline of Fuel Injection Control

The present apparatus starts the calculation associated with estimation of the soot concentration [Soot]mix within the gas mixture by use of the above-described model, immediately after IVC at which the quantity of the cylinder interior gas is determined, and completes the estimation of the above-described soot generation mass Sootnew before the fuel injection start timing CAinj comes.

Subsequently, the present apparatus obtains a target soot generation mass Sootter, and, when the estimated soot generation mass Sootnew is sufficiently greater than the target soot generation mass Sootter, feedback-controls the fuel injection pressure so as to reduce the soot generation mass Sootnew.

Specifically, when the value obtained by subtracting the target soot generation mass Sootter from the soot generation mass Sootnew is greater than a predetermined value, the present apparatus increases the fuel injection start pressure from the base fuel injection pressure Pcrbase by a predetermined amount. Thus, the soot generation mass Sootnew is controlled in a decreasing direction. The above is the outline of the fuel injection control.

Actual Operation

Next, actual operations of the soot generation amount estimation apparatus having the above-described configuration will be described.

<Calculation of Gas Mixture Temperature, etc., and Emission Amount>

The CPU 61 repeatedly executes, at predetermined intervals, a routine shown by the flowcharts of FIGS. 6 to 10 and adapted to calculate the gas mixture temperature, etc., and the soot generation amount. Therefore, when a predetermined timing has been reached, the CPU 61 starts the processing from Step 600, and then proceeds to Step 605 so as to determine whether or not the intake valve Vin is closed (that is, whether or not IVC has come). When the CPU 61 makes a "No" determination in Step 605, it proceeds directly to Step 695 and ends the current execution of the present routine.

Here, it is assumed that IVC has come in a certain cylinder. In this case, the CPU 61 makes a "Yes" determination in Step 605, and proceeds to Step 610. Subsequently, the CPU 61 proceeds to Step 615 so as to obtain the total mass Mg of the interior gas in accordance with the above-described Eq. 22 on the basis of the IVC cylinder-interior gas pressure Pgivc and the IVC cylinder-interior gas temperature Tgivc.

Figure 11:
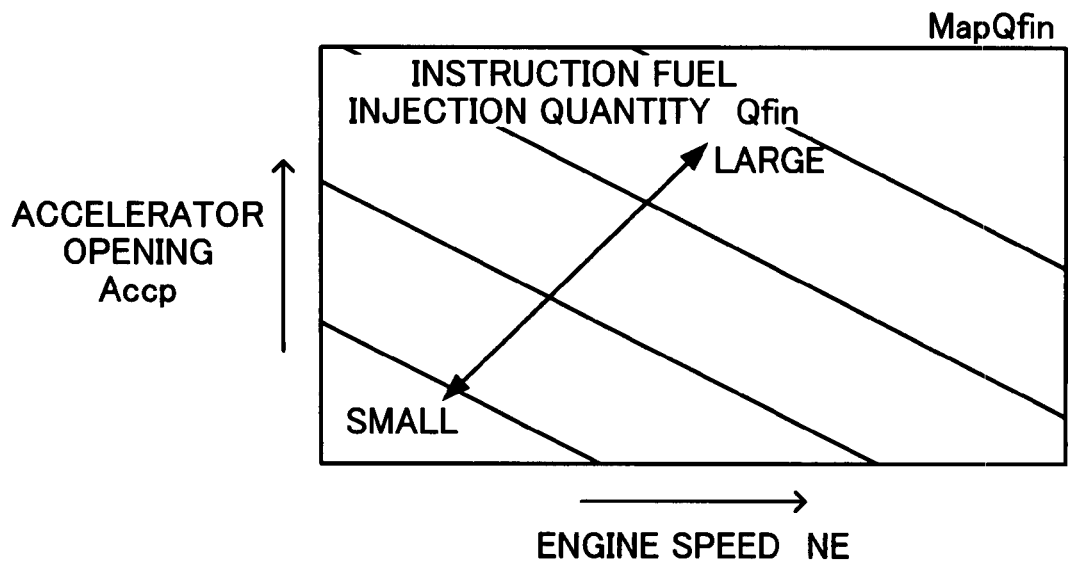
FIG. 11 is a table for determining instruction fuel injection quantity to which the CPU shown in FIG. 1 refers during execution of the routine shown in FIG. 6.

Next, the CPU 61 proceeds to Step 620, and obtains the instruction fuel injection quantity Qfin (in actuality, fuel injection period TAU) from the accelerator opening Accp at the present point in time, which is obtained from the accelerator opening sensor 75, the engine speed NE at the present point in time, which is obtained from the crank position sensor 74, and a table (map) MapQfin shown in FIG. 11. The table MapQfin defines the relation between accelerator opening Accp and engine speed NE, and instruction fuel injection quantity Qfin; and is stored in the ROM 62.

Figure 12:
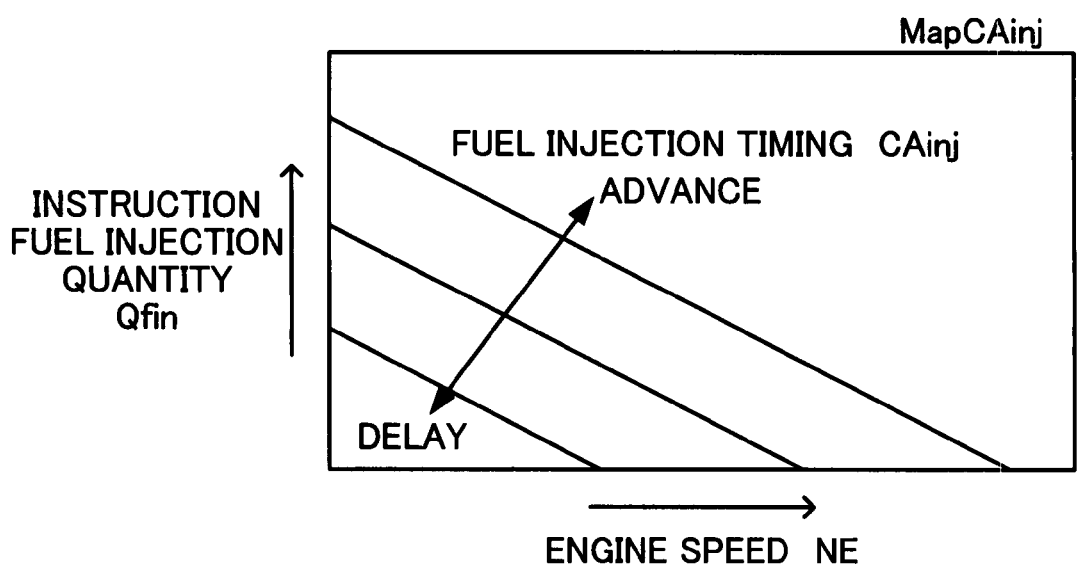
FIG. 12 is a table for determining fuel injection timing, to which the CPU shown in FIG. 1 refers during execution of the routine shown in FIG. 6.

Subsequently, the CPU 61 proceeds to Step 625 so as to determine the fuel injection start timing (crank angle) CAinj from the instruction fuel injection quantity Qfin and the engine speed NE, and a table MapCAinj shown in FIG. 12. The table MapCAinj defines the relation between instruction fuel injection quantity Qfin and engine speed NE, and fuel injection start timing CAinj; and is stored in the ROM 62.

Figure 13:
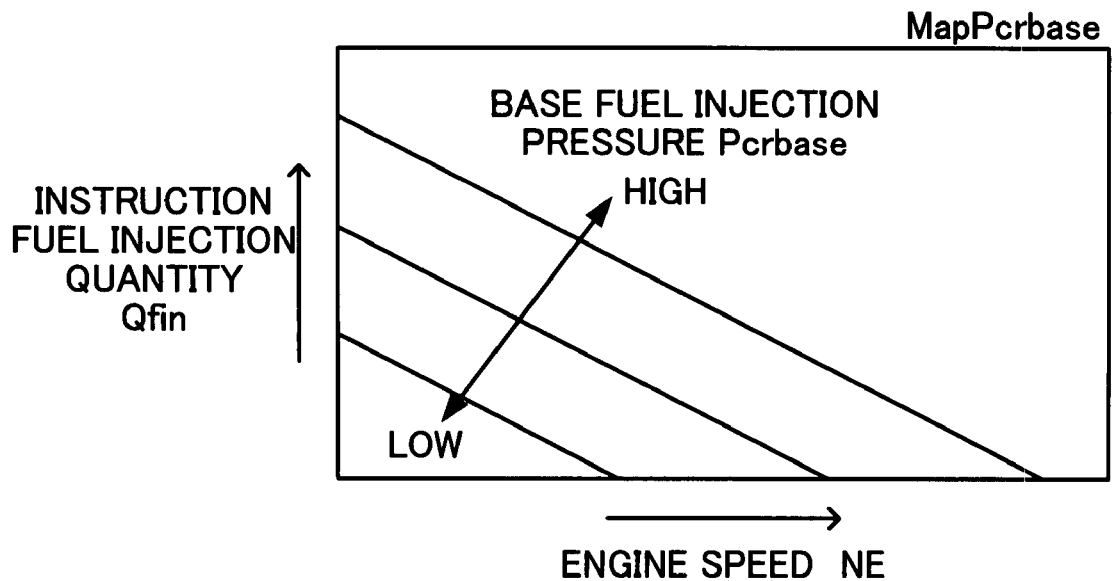
FIG. 13 is a table for determining a base fuel injection pressure, to which the CPU shown in FIG. 1 refers during execution of the routine shown in FIG. 6.

Subsequently, the CPU 61 proceeds to Step 630 so as to determine the base fuel injection pressure Pcrbase from the instruction fuel injection quantity Qfin and the engine speed NE, and a table MapPcrbase shown in FIG. 13. The table MapPcrbase defines the relation between instruction fuel injection quantity Qfin and engine speed NE, and base fuel injection pressure Pcrbase; and is stored in the ROM 62.

Next, the CPU 61 proceeds to Step 635 so as to obtain the fuel vapor temperature Tf on the basis of the fuel temperature Tcr at the present point in time, which is obtained from the fuel temperature sensor 76, and the above-described Eq. 35. Subsequently, the CPU 61 proceeds to Step 640 so as to obtain the cylinder-interior-gas stoichiometric air-fuel ratio stoich on the basis of the above-described intake-gas oxygen concentration [O2]in and a function funcstoich for obtaining the cylinder-interior-gas stoichiometric air-fuel ratio stoich while using [O2]in as an argument.

Next, the CPU 61 proceeds to Step 645 so as to obtain a minute crank angle $\Delta CA$, which corresponding to the minute time $\Delta t$ (e.g., 0.1 msec) on the basis of the engine speed NE at the present point in time, the minute time $\Delta t$, and a function func$\Delta CA$ for obtaining the minute crank angle $\Delta CA$ while using NE and $\Delta t$ as arguments. This minute crank angle $\Delta CA$ is a crank angle corresponding to the minute time $\Delta t$ in the case where the engine speed NE assumes a value at the present point in time (that is, immediately after IVC).

Subsequently, the CPU 61 proceeds to Step 650, and obtains a fuel-injection-start-time cylinder interior gas density $\rho g0$ by dividing the cylinder-interior-gas total mass Mg obtained in the previously described Step 615, by a fuel-injection-start-time cylinder interior volume Vg(CAinj), which is obtained from the fuel injection start timing CAinj obtained in the previously described Step 625.

Subsequently, the CPU 61 proceeds to Step 655, and obtains a fuel-injection-start-time cylinder interior gas pressure Pg0 on the basis of the IVC cylinder interior gas pressure Pgivc obtained in the previously described Step 610, the above-described IVC cylinder interior volume Vg(CAivc), the above-described fuel injection-start-time cylinder interior volume Vg(CAinj), and the above-described Eq. 21.

Next, the CPU 61 proceeds to Step 660, and obtains an effective injection pressure $\Delta P$ by subtracting the above-described fuel-injection-start-time cylinder interior gas pressure Pg0 from the base fuel injection pressure Pcrbase obtained in the previously described Step 630. In Step 665 subsequent thereto, the CPU 61 obtains the spray angle $\theta$ (see FIG. 3) on the basis of the effective injection pressure $\Delta P$, the cylinder interior gas density $\rho g0$, and a table Map$\theta$.

Figure 7:
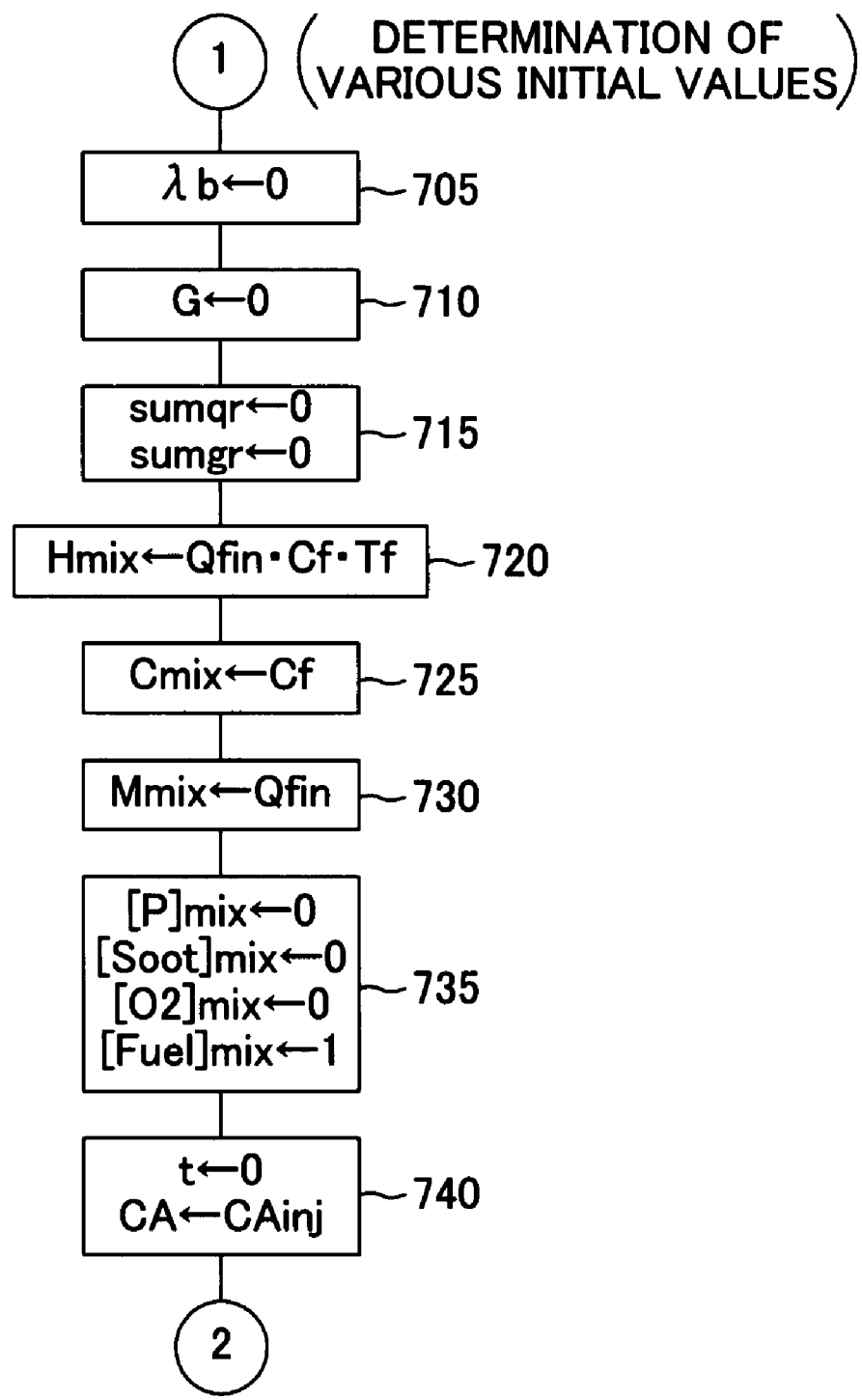
FIG. 7 is a flowchart showing a second portion of the routine which the CPU shown in FIG. 1 executes so as to calculate gas mixture temperature, etc. and soot generation amount.

Next, the CPU 61 proceeds to Step 705 of FIG. 7 so as to set an excess air factor previous value $\lambda b$ to 0 (initial value), proceeds to Step 710 so as to set the value of the gas-mixture-forming cylinder interior gas mass G to 0 (initial value), and then proceeds to Step 715 so as to set a fuel-consumption cumulative value sumqr and a cylinder-interior-gas-consumption cumulative value sumgr to 0 (initial value).

Subsequently, the CPU 61 proceeds to Step 720 so as to set the gas-mixture enthalpy Hmix to an initial value (that is, the product of the instruction fuel injection quantity Qfin obtained in the previously described Step 620, the constant-pressure specific heat Cf of fuel, and the fuel vapor temperature Tf obtained in the previously described Step 635) in accordance with an equation corresponding to the above-described Eq. 34.

Next, the CPU 61 proceeds to Step 725 so as to set the constant-pressure specific heat Cmix of the gas mixture to the fuel constant-pressure specific heat Cf (initial value), and then proceeds to Step 730 so as to set the gas mixture mass Mmix to the instruction fuel injection quantity Qfin (initial value).

Next, the CPU 61 proceeds to Step 735 so as to set the precursor P concentration [P]mix within the gas mixture, the soot concentration [Soot]mix within the gas mixture, the oxygen concentration [O2]mix to 0 (initial value) and set the fuel concentration [Fuel]mix within the gas mixture to 1 (initial value). Subsequently, the CPU 61 proceeds to Step 740 so as to set the post injection time t to 0 (initial value) and set the crank angle CA to the fuel injection start timing CAinj (initial value). With this, the post injection time t is counted from the fuel injection start timing CAinj. In this manner, various initial values are determined.

Figure 8:
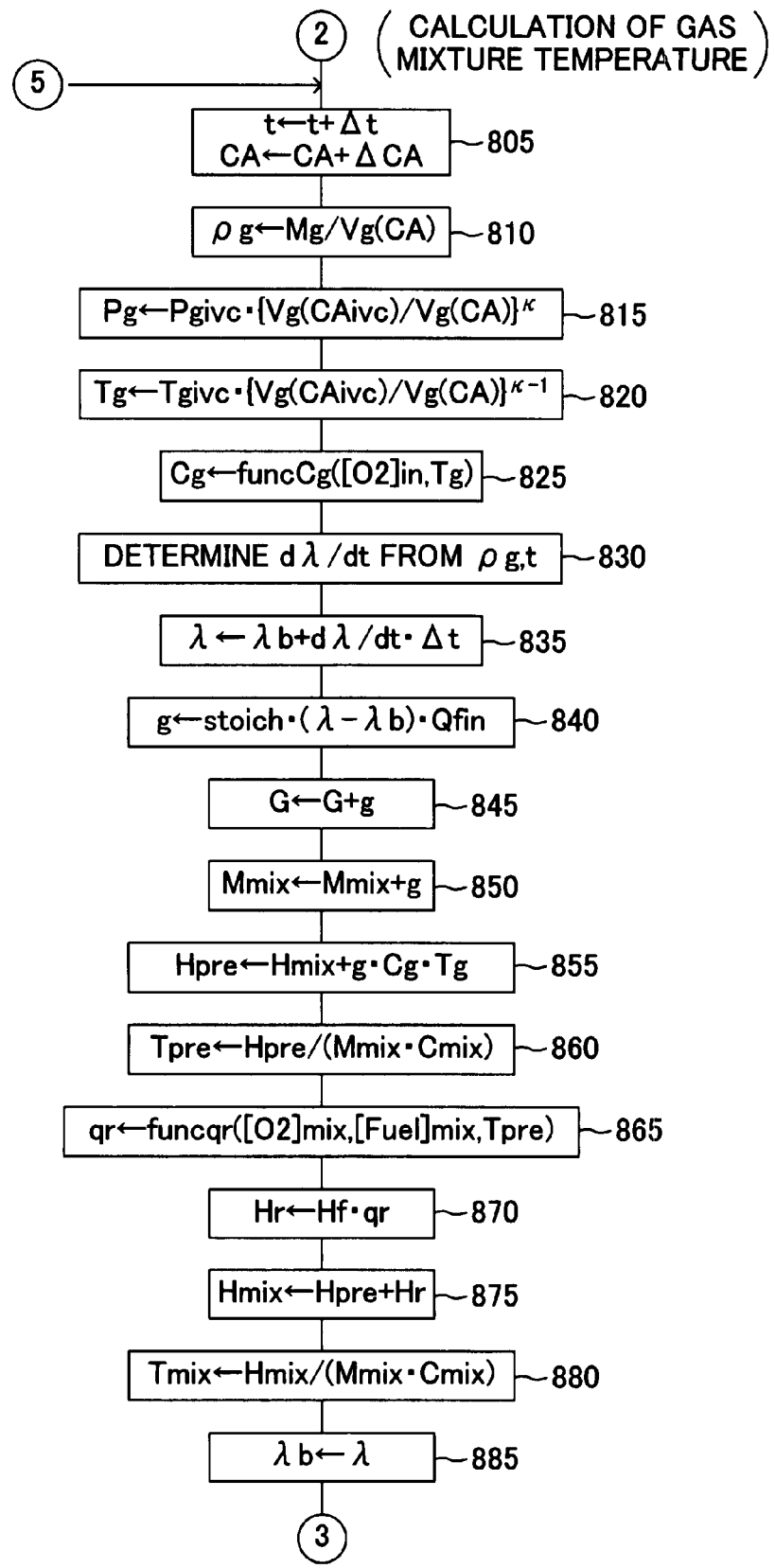
FIG. 8 is a flowchart showing a third portion of the routine which the CPU shown in FIG. 1 executes so as to calculate gas mixture temperature, etc. and soot generation amount.

Next, the CPU 61 proceeds to the routine of FIG. 8, and starts processing for calculating the gas mixture temperature Tmix. Specifically, the CPU 61 first proceeds to Step 805 so as to increase (update) the value of the post injection time t ("0" at the present point in time) by the minute time $\Delta t$, and increase (update) the value of the crank angle CA ("CAinj" at the present point in time) by the minute crank angle $\Delta CA$. In this manner, the value of the crank angle CA is changed to correspond to the post injection time t. With this updating, the post injection time t becomes equal to $\Delta t$, and the crank angle CA becomes equal to CAinj+$\Delta CA$.

Subsequently, the CPU 61 proceeds to Step 810, and obtains the cylinder interior gas density $\rho g$ at the post injection time t (accordingly, at the crank angle CA) by dividing the cylinder-interior-gas total mass Mg obtained in the previously described Step 615, by the cylinder interior volume Vg(CA) corresponding to the crank angle CA updated in the above-described Step 805.

Next, the CPU 61 proceeds to Step 815, and obtains the cylinder interior gas pressure Pg at the post injection time t (accordingly, at the crank angle CA) on the basis of the IVC cylinder interior gas pressure Pgivc obtained in the previously described Step 610, the above-described IVC cylinder interior volume Vg(CAivc), the above-described cylinder interior volume Vg(CA) corresponding to the crank angle CA, and the above-described Eq. 39.

Next, the CPU 61 proceeds to Step 820, and obtains the cylinder interior gas temperature Tg at the post injection time t (accordingly, at the crank angle CA) on the basis of the IVC cylinder interior gas temperature Tgivc obtained in the previously described Step 610, the above-described IVC cylinder interior volume Vg(CAivc), the above-described cylinder interior volume Vg(CA) corresponding to the crank angle CA, and the above-described Eq. 29.

Next, the CPU 61 proceeds to Step 825, and obtains the constant-pressure specific heat Cg of the cylinder interior gas at the post injection time t (accordingly, at the crank angle CA) on the basis of the intake-gas oxygen concentration [O2]in obtained in the previously described Step 610, the cylinder interior gas temperature Tg obtained in Step 820, a function funcCg for obtaining the constant-pressure specific heat Cg of the cylinder interior gas while using [O2]in and Tg as arguments, and the above-described Eq. 30.

Subsequently, the CPU 61 proceeds to Step 830, and obtains the fuel dilution ratio $d\lambda/dt$ on the basis of the cylinder interior gas density $\rho g$ obtained in the previously described Step 810, the spray angle $\theta$ obtained in the previously described Step 665, the effective injection pressure $\Delta P$ obtained in the previously described Step 660, the post injection time t updated in the previously described Step 805, and the above-described Eq. 20.

Next, the CPU 61 proceeds to Step 835, and updates, in accordance with the above-described Eq. 19, the excess air factor $\lambda$ of the gas mixture to a value obtained by adding, to the excess air factor previous value $\lambda b$ at that time ("0" at the present point in time because of the processing of Step 705), a value $(d\lambda/dt \cdot \Delta t)$ obtained by multiplying the fuel dilution ratio $d\lambda/dt$ by the minute time $\Delta t$. Thus, the excess air factor $\lambda$ of the gas mixture at the post injection time t (accordingly, at the crank angle CA) is obtained.

Next, the CPU 61 proceeds to Step 840, and obtains the mass g of a cylinder interior gas newly mixed with the gas mixture in the minute time $\Delta t$ (in a period between the post injection time $(t-\Delta t)$ and the post injection time t) on the basis of the cylinder-interior-gas stoichiometric air-fuel ratio stoich obtained in the previously described Step 640, the excess air factor $\lambda$ obtained in Step 835, the excess air factor previous value $\lambda b$ ("0" at the present point in time because of the processing of Step 705; from the next time, a value set in Step 885 to be described later), the instruction fuel injection quantity Qfin set in Step 620, and an equation corresponding to the above-described Eq. 28.

Subsequently, the CPU 61 proceeds to Step 845, and updates the gas-mixture-forming cylinder interior gas mass G to a value obtained by adding the mass g of the above-described newly mixed cylinder interior gas to the value at that time ("0" at the present point in time because of the processing of Step 710). With this updating, the gas-mixture-forming cylinder interior gas mass G at the post injection time t (accordingly, at the crank angel CA) is obtained.

Next, the CPU 61 proceeds to Step 850, and updates the gas mixture mass Mmix to a value obtained by adding the mass g of the above-described newly mixed cylinder interior gas to the value at that time (the instruction fuel injection quantity Qfin at the present point in time because of the processing of Step 730). With this updating, the gas mixture mass Mmix at the post injection time t (accordingly, at the crank angel CA) is obtained.

Subsequently, the CPU 61 proceeds to Step 855, and sets the enthalpy Hpre of the gas mixture prior to occurrence of chemical reactions to a value obtained by adding, to the gas mixture enthalpy Hmix at that time ((Qfin·Cf·Tf) at the present point in time because of the processing of Step 720), the "thermal energy $\Delta Hg=g \cdot Cg \cdot Tg$ of the above-described newly mixed cylinder interior gas" obtained in accordance with the above-described Eq. 27.

Next, the CPU 61 proceeds to Step 860, and obtains the temperature Tpre of the gas mixture prior to occurrence of chemical reactions in accordance with an equation corresponding to the above-described Eq. 33, by dividing the enthalpy Hpre of the gas mixture prior to occurrence of chemical reactions by a value obtained by multiplying the gas mixture mass Mmix obtained in the above-described Step 850 by the constant-pressure specific heat Cmix of the gas mixture at that time (the constant-pressure specific heat Cf of fuel at the present point in time because of the processing of Step 725; from the next time, a value set in Step 925 to be described later).

Next, the CPU 61 proceeds to Step 865, and obtains the consumption amount qr of fuel stemming from chemical reactions occurring within the gas mixture in the minute time $\Delta t$ (in a period between the post injection time $(t-\Delta t)$ and the post injection time t)) on the basis of the oxygen concentration [O2]mix within the gas mixture at that time ("0" at the present point in time because of the processing of Step 735; from the next time, a value set in Step 920 to be described later), the fuel concentration [Fuel]mix ("1" at the present point in time because of the processing of Step 735; from the next time, a value set in Step 915 to be described later), the above-described gas mixture temperature Tpre before chemical reactions, and the above-described Eq. 32.

Subsequently, the CPU 61 proceeds to Step 870 so as to obtain a reaction heat Hr stemming from chemical reactions occurring within the gas mixture in the minute time $\Delta t$ (in a period between the post injection time $(t-\Delta t)$ and the post injection time t)) on the basis of the thus-obtained fuel consumption amount qr and the above-described Eq. 31, and then proceeds to Step 875 so as to set (update) the enthalpy Hmix of the gas mixture to a value obtaining by adding the thus-obtained reaction heat Hr to the above-described enthalpy Hpre of the gas mixture before chemical reactions. As a result, the enthalpy Hmix of the gas mixture at the post injection time t (accordingly, at the crank angle CA) is obtained.

The CPU 61 then proceeds to Step 880, and obtains the gas mixture temperature Tmix on the basis of the enthalpy Hmix of the gas mixture obtained in the above-described Step 875, the gas mixture mass Mmix obtained in the above-described Step 850, the constant-pressure specific heat Cmix of the gas mixture at that time (the constant-pressure specific heat Cf of fuel at the present point in time because of the processing of Step 725; from the next time, a value set in Step 925 to be described later), and the above-described Eq. 24. As a result, the gas mixture temperature Tmix at the time when the post injection time t=Δt (accordingly, the crank angle CA=CAinj+ ΔCA) is obtained.

Next, the CPU 61 proceeds to Step 885 so as to set the excess air factor previous value λb to the value of the excess air factor λ obtained in the above-described Step 835. After this point in time, this value is used in the above-described Step 835. In this manner, the gas mixture temperature Tmix at the post injection time t is calculated.

Figure 9:
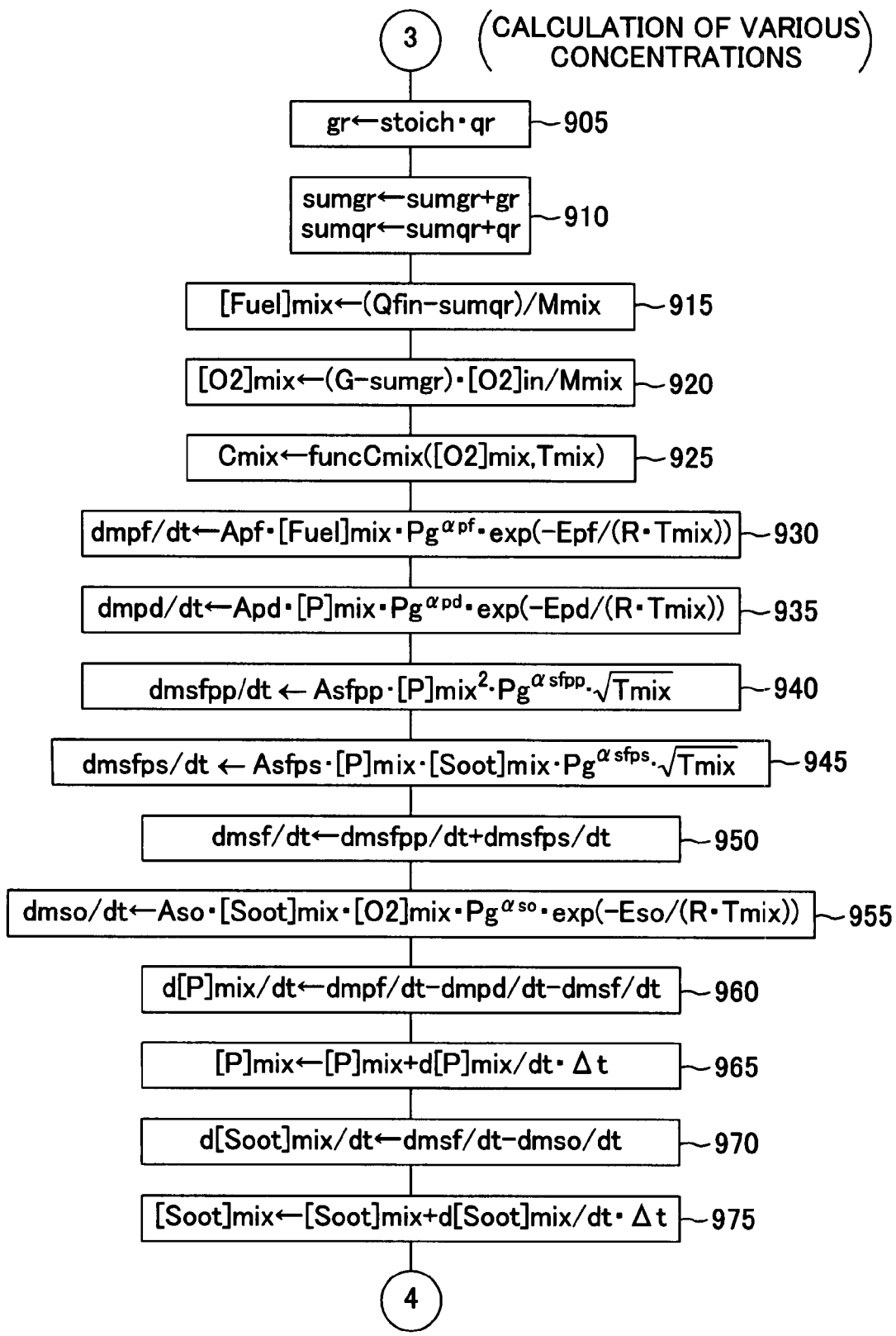
FIG. 9 is a flowchart showing a fourth portion of the routine which the CPU shown in FIG. 1 executes so as to calculate gas mixture temperature, etc. and soot generation amount.

Next, the CPU 61 proceeds to the routine of FIG. 9 so as to start processing for calculating various concentrations. Specifically, the CPU 61 first proceeds to Step 905, and obtains the consumption amount gr of the cylinder interior gas stemming from chemical reactions occurring within the gas mixture in the minute time Δt (in a period between the post injection time (t−Δt) and the post injection time t)) on the basis of the consumption amount qr of fuel stemming from chemical reactions occurring within the gas mixture in the minute time Δt (in a period between the post injection time (t−Δt) and the post injection time t)) obtained in the above-described Step 865, the cylinder-interior-gas stoichiometric air-fuel ratio stoich obtained in Step 640, and the above-described Eq. 37.

Subsequently, the CPU 61 proceeds to Step 910 so as to set the fuel-consumption cumulative value sumqr to a value obtained by adding the fuel consumption amount qr obtained in Step 865 to the value at that time ("0" at the present point in time because of the processing of Step 715), and set the cylinder-interior-gas-consumption cumulative value sumgr to a value obtained by adding the cylinder-interior-gas-consumption amount gr obtained in Step 905 to the value at that time ("0" at the present point in time because of the processing of Step 715). With this processing, the fuel-consumption cumulative value sumqr and the cylinder-interior-gas-consumption cumulative value sumgr at the post injection time t (accordingly, at the crank angle CA) are obtained.

Next, the CPU 61 proceeds to Step 915, and obtains the fuel concentration [Fuel]mix within the gas mixture at the post injection time t (accordingly, at the crank angle CA) on the basis of the instruction fuel injection quantity Qfin obtained in Step 620, the fuel-consumption cumulative value sumqr obtained in the previous step, the gas mixture mass Mmix obtained in Step 850, and the above-described Eq. 36.

Next, the CPU 61 proceeds to Step 920, and obtains the oxygen concentration [O2]mix within the gas mixture at the post injection time t (accordingly, at the crank angle CA) on the basis of the gas-mixture-forming cylinder interior gas mass G obtained in Step 845, the cylinder-interior-gas-consumption cumulative value sumgr obtained in the previous step, the intake-gas oxygen concentration [O2]in set in Step 610, the gas mixture mass Mmix obtained in Step 850, and the above-described Eq. 38.

Subsequently, the CPU 61 proceeds to Step 925, and obtains the constant-pressure specific heat Cmix of the gas mixture at the post injection time t (accordingly, at the crank angle CA) on the basis of the oxygen concentration [O2]mix within the gas mixture obtained in the above-described Step 920, the gas mixture temperature Tmix obtained in Step 880, and the above-described Eq. 26. After this point in time, this value is used in Steps 860 and 880.

Next, the CPU 61 proceeds to Step 930, and obtains the precursor P formation speed dmpf/dt on the basis of the fuel concentration [Fuel]mix within the gas mixture obtained in the above-described Step 915, the cylinder interior gas pressure Pg obtained in the above-described Step 815, the gas mixture temperature Tmix obtained in the above-described Step 880, and the above-described Eq. 3. Notably, Step 930 corresponds to the precursor formation speed calculation means.

Subsequently, the CPU 61 proceeds to Step 935, and obtains the precursor P decomposition speed dmpd/dt on the basis of the precursor P concentration [P]mix within the gas mixture updated in Step 965 to be described later, the above-described cylinder interior gas pressure Pg, the above-described gas mixture temperature Tmix, and the above-described Eq. 4. Notably, Step 935 corresponds to the precursor decomposition speed calculation means.

Next, the CPU 61 proceeds to Step 940 so as to obtain the above-described first soot formation speed dmsfpp/dt on the basis of the above-described precursor P concentration [P]mix within the gas mixture, the above-described cylinder interior gas pressure Pg, the above-described gas mixture temperature Tmix, and the above-described Eq. 16, and then proceeds to Step 945 so as to obtain the above-described second soot formation speed dmsfps/dt on the basis of the above-described precursor P concentration [P]mix within the gas mixture, the soot concentration [Soot]mix within the gas mixture updated in Step 975 to be described later, the above-described cylinder interior gas pressure Pg, the above-described gas mixture temperature Tmix, and the above-described Eq. 13. Notably, Step 940 corresponds to the first soot formation speed calculation means, and Step 945 corresponds to the second soot formation speed calculation means.

Next, the CPU 61 proceeds to Step 950, and obtains the soot formation speed dmsf/dt on the basis of the above-described first soot formation speed dmsfpp/dt, the above-described second soot formation speed dmsfps/dt, and the above-described Eq. 5. Notably, Step 950 corresponds to the soot formation speed calculation means.

Subsequently, the CPU 61 proceeds to Step 955, and obtains the soot oxidation speed dmso/dt on the basis of the above-described soot concentration [Soot]mix within the gas mixture, the above-described oxygen concentration [O2]mix within the gas mixture, the above-described cylinder interior gas pressure Pg, the above-described gas mixture temperature Tmix, and the above-described Eq. 17. Notably, Step 955 corresponds to the soot oxidation speed calculation means.

Next, the CPU 61 proceeds to Step 960, and obtains the precursor P generation speed d[P]mix/dt on the basis of the precursor P formation speed dmpf/dt obtained in the above-described Step 930, the precursor P decomposition speed dmpd/dt obtained in the above-described Step 935, the soot formation speed dmsf/dt obtained in the above-described Step 950, and the above-described Eq. 1. Notably, Step 960 corresponds to the precursor generation speed calculation means.

Subsequently, the CPU 61 proceeds to Step 965, and sets (updates) the precursor P concentration [P]mix within the gas mixture to a value obtained by adding, to the value at that time ("0" at the present point in time because of the processing of Step 735), a value (d[P]mix/dt·Δt) obtained by multiplying the precursor P generation speed d[P]mix/dt by the minute time Δt. As a result, the precursor P concentration [P]mix within the gas mixture at the time when the post injection time t=Δt (accordingly, the crank angle CA=CAinj+ΔCA) is obtained.

Next, the CPU 61 proceeds to Step 970 so as to obtain the soot generation speed d[Soot]mix/dt on the basis of the soot formation speed dmsf/dt obtained in the previous step, the soot oxidation speed dmso/dt obtained in the previous step, and the above-described Eq. 2, and then proceeds to Step 975 so as to set (update) the soot concentration [Soot]mix within the gas mixture to a value obtained by adding, to the value at that time ("0" at the present point in time because of the processing of Step 735), a value (d[Soot]mix/dt·Δt) obtained by multiplying the soot generation speed d[Soot]mix/dt by the minute time Δt. As a result, the soot concentration [Soot]mix within the gas mixture at the time when the post injection time t=Δt (accordingly, the crank angle CA=CAinj+ΔCA) is obtained. Notably, Step 970 corresponds to the soot generation speed calculation means, and Step 975 corresponds to the soot generation amount estimation means.

Subsequently, the CPU 61 proceeds to Step 1005 of FIG. 10 so as to determine whether or not the crank angle CA is after the compression top dead center (hereinafter, called "TDC") and the gas mixture temperature Tmix at the post injection time t (accordingly, at the crank angle CA) obtained in Step 880 is lower than the soot formation reaction limit temperature Tmin, or the crank angle CA coincides with a predetermined end determination crank angle CAend after TDC.

At the present point in time, as described above, the crank angle CA is the value obtained by adding the minute crank angle ΔCA to the fuel-injection-start-time crank angle CAinj (accordingly, before TDC), and therefore, has not yet reached the above-mentioned end determination crank angle CAend.

Accordingly, at the present point in time, the CPU 61 makes a "No" determination in Step 1005, and returns to Step 805 of FIG. 8. In Step 805, the CPU 61 increases (updates) the post injection time t ("1·Δt" at the present point in time) by the minute time Δt, and increases (updates) the crank angle CA ("CAinj+ΔCA" at the present point in time) by the minute crank angle ΔCA. After that, the CPU 61 again executes the processing of Step 810 of FIG. 8 to Step 1005 of FIG. 10.

With this processing, the excess air factor λ of the gas mixture (see Step 835), the gas mixture temperature Tmix (see Step 880), and the various concentrations ([Fuel]mix, [O2]mix, [P]mix, [Soot]mix (see Steps 915, 920, 965, and 975) at the time when the post injection time t=2·Δt (the crank angle CA=CAinj+2·CA) are calculated.

Figure 10:
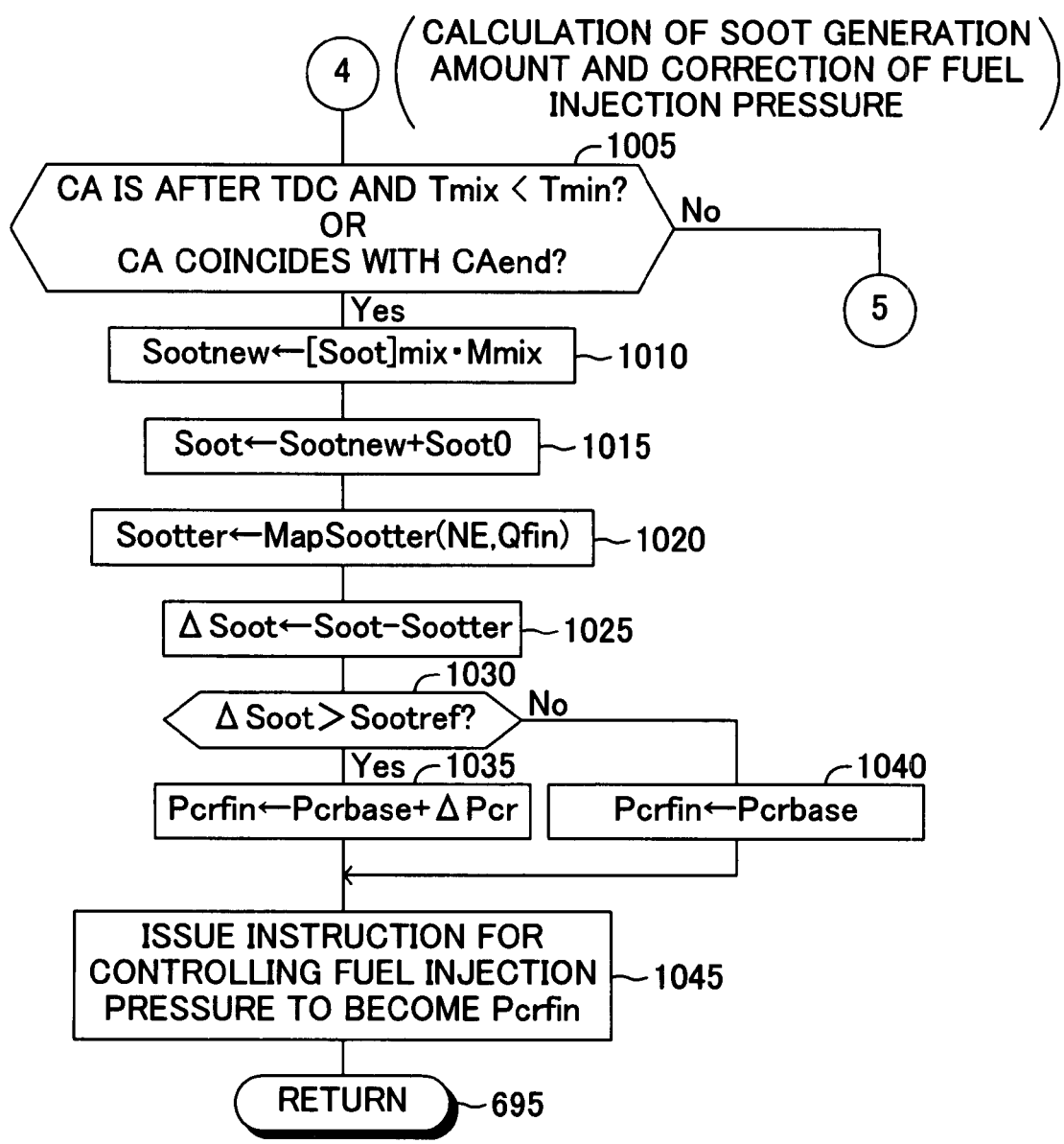
FIG. 10 is a flowchart showing a fifth portion of the routine which the CPU shown in FIG. 1 executes so as to calculate gas mixture temperature, etc. and soot generation amount.

Every time a "No" determination is made in Step 1005 of FIG. 10, the processing of Step 810 of FIG. 8 to Step 1005 of FIG. 10 is repeatedly performed. As a result, so long as a "No" determination is made in Step 1005 of FIG. 10, the excess air factor λ of the gas mixture, the gas mixture temperature Tmix, and the various concentrations ([Fuel]mix, [O2]mix, [P]mix, [Soot]mix) are updated at intervals of the minute time Δt (that is, at intervals of the minute crank angle ΔCA from CAinj).

When the gas mixture temperature Tmix decreases as a result of, for example, an increase in the cylinder interior volume in the expansion stroke after TDC and becomes lower than the soot formation reaction limit temperature Tmin or when the crank angle CA reaches the above-described end determination crank angle CAend, the CPU 61 makes a "Yes" determination when it proceeds to Step 1005 of FIG. 10. In this case, the CPU 61 proceeds to Step 1010 and subsequent steps.

In Step 1010, the CPU 61 obtains the soot generation mass Sootnew by multiplying the current value of the soot concentration [Soot]mix updated by the processing of the previously described Step 975 by the current value of the gas mixture mass Mmix updated by the processing of the previously described Step 850.

Next, the CPU 61 proceeds to Step 1015, and sets the soot total mass Soot to a value obtained by adding a predetermined residual value Soot0 to the soot generation mass Sootnew obtained in the previous step. The residual value Soot0 corresponds to the mass of soot which has already been contained in the cylinder interior gas (specifically, contained in the EGR gas) at the fuel injection start time.

Next, the CPU 61 proceeds to Step 1020, and obtains the target soot generation mass Sootter on the basis of the engine speed NE at the present point in time (i.e., a point in time immediately after IVC), the instruction fuel injection quantity Qfin determined in the above-described Step 620, and a table MapSootter.

Next, the CPU 61 proceeds to Step 1025, and sets a soot generation amount deviation ΔSoot to a value obtained by subtracting the target soot generation mass Sootter from the soot total mass Soot obtained in Step 1015.

Subsequently, the CPU 61 proceeds to Step 1030 so as to determine whether or not the thus-obtained soot generation amount deviation ΔSoot is greater than a reference value Sootref. When the CPU 61 makes a "Yes" determination, it proceeds to Step 1035 so as to set the final fuel injection pressure Pcrfin to a value obtained by adding a predetermined value iPcr to the base fuel injection pressure Pcrbase determined in the above-described Step 630. As a result, the fuel injection pressure is corrected to decrease the soot generation mass Sootnew.

Meanwhile, when the CPU 61 makes a "No" determination in Step 1030, it proceeds to Step 1040 so as to set the final fuel injection pressure Pcrfin to a value equal to the base fuel injection pressure Pcrbase. In this case, the fuel injection pressure is not corrected.

The CPU 61 then proceeds to Step 1045, and issues an instruction for controlling the fuel injection pump 22 (its drive circuit) such that the fuel injection pressure becomes the set final fuel injection pressure Pcrfin. After that, the CPU 61 proceeds to Step 695 so as to end the current execution of the present routine of FIGS. 6 to 10. After that, the CPU 61 makes a "No" determination whenever proceeds to Step 605 until the next IVC comes.

As a result, through execution of the present routine, every time IVC comes, the fuel injection conditions (injection quantity, injection pressure, injection timing) are determined, the soot generation mass Sootnew (accordingly, the soot total mass Soot) is estimated immediately, and the injection pressure is corrected on the basis of the estimation result.

Figure 14:
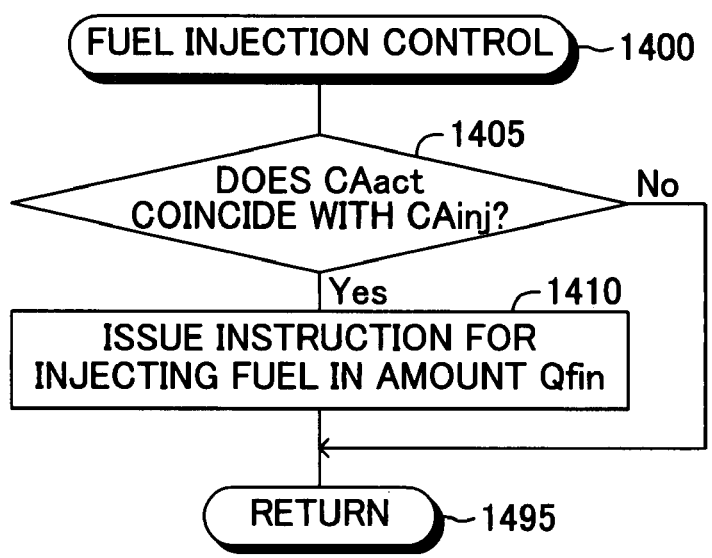
FIG. 14 is a flowchart showing a routine which the CPU shown in FIG. 1 executes so as to perform fuel injection control.

Further, the CPU 61 repeatedly executes, at predetermined intervals, a routine shown by the flowchart of FIG. 14 and adapted to perform fuel injection control for each cylinder. Therefore, when a predetermined timing has been reached, the CPU 61 starts the processing from Step 1400, and then proceeds to Step 1405 so as to determine whether or not the actual crank angle CAact coincides with the fuel injection start timing CAinj determined in the previously described Step 625. When the CPU 61 makes a "No" determination, it proceeds directly to Step 1495 and ends the current execution of the present routine.

Here, the actual crank angle CAact is assumed to have reached the fuel injection start timing CAinj. In this case, the CPU 61 proceeds to Step 1410, and issues an instruction to the corresponding fuel injection valve 21 so as to inject fuel of the instruction fuel injection quantity Qfin determined in Step 620 (specifically, an instruction for opening the valve for the fuel injection period TAU). After that, the CPU 61 proceeds to Step 1495 so as to end the current execution of the present routine. As a result, fuel of the instruction fuel injection quantity Qfin is injected under the final fuel injection pressure Pcrfin set in the previously described Step 1035 or 1040.

As described above, according to the embodiment of the soot generation amount estimation apparatus of the present invention, the precursor P generation speed d[P]mix/dt (accordingly, the precursor P concentration [P]mix within the gas mixture) is obtained in consideration of a reaction in which a precursor P is formed from fuel, a reaction in which the formed precursor P thermally decomposes, and a reaction in which soot is formed from the formed precursor P; and the soot generation speed d[Soot]mix/dt (accordingly, the soot concentration [Soot]mix within the gas mixture (soot generation amount)) is estimated in consideration of a reaction in which soot is formed from the precursor P and which depends on the precursor P concentration [P]mix within the gas mixture and a reaction in which the formed soot is oxidized.

In the reaction model used in the embodiment, a reaction process in which soot is generated from fuel is divided into two processes; i.e., a reaction process in which a precursor P is generated from fuel, and a reaction process in which soot is generated from the precursor P. Therefore, the reaction model can accurately simulate a "delay in soot generation (reaction)" and a "phenomenon in which the soot generation speed decreases as the gas mixture temperature increases when the gas mixture temperature exceeds a certain temperature," which are experimentally or empirically known in relation to the reaction process in which soot is generated from fuel. As a result, soot generation amount can be accurately estimated.

Figure 15:
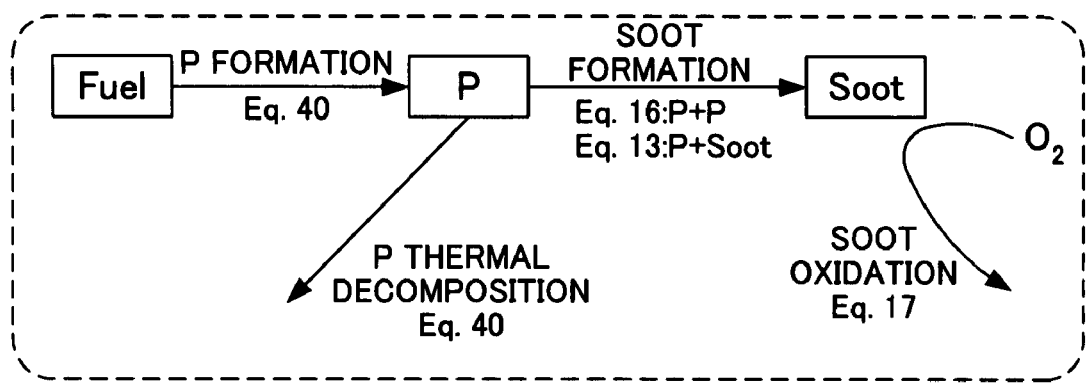
FIG. 15 is a diagram showing a reaction model which a soot generation amount estimation apparatus according to a modification of the embodiment uses and which represents a reaction process in which soot is generated directly from fuel.

The present invention is not limited to the above-described embodiment, and various modifications may be employed within the scope of the invention. For example, in the above-described embodiment, as in the reaction model shown in FIG. 5, for calculation of the precursor P generation speed d[P]mix/dt (see Step 960 of FIG. 9), the precursor P formation speed dmpf/dt and the precursor P decomposition speed dmpd/dt are individually calculated by use of the above-described Eq. 3 and Eq. 4, each of which is an Arrhenius equation (see Steps 930 and 935 of FIG. 9). However, the soot generation amount estimation apparatus of the present invention may be configured to calculate the precursor P generation speed d[P]mix/dt by use of a reaction model shown in FIG. 15. Specifically, in this modification, a precursor P net formation speed dmpfd/dt, which is a value obtained by subtracting the precursor P decomposition speed dmpd/dt from the precursor P formation speed dmpf/dt, is calculated by use of the following Eq. 40, which is a Gaussian equation; and the precursor P generation speed d[P]mix/dt is calculated by subtracting the soot formation speed dmsf/dt, calculated by use of the above-described Eq. 5 (Eq. 16+Eq. 13), from the precursor P net formation speed dmpfd/dt.

In this case, in the routine of FIG. 9, in place of Steps 930 and 935, a step for calculating the precursor P net formation speed dmpfd/dt by use of the following Eq. 40 is provided, and the process of Step 960 is replaced with "d[P]mix/dt←dmfd/dt−dmsf/dt."

$$dmpfd/dt = Apfd \cdot [\text{Fuel}]\text{mix} \cdot Pg^{\alpha pfd} \cdot \exp\left(\frac{-(Tmix - T1)^2}{2 \cdot \sigma 1^2}\right) \quad (40)$$

In Eq. 40, Apfd, αpfd, T1 (peak temperature), and σ1 (standard deviation) are constants. [Fuel]mix represents the fuel concentration within the gas mixture; Pg represents the cylinder interior gas pressure; and Tmix represents the gas mixture temperature. According to Eq. 40, the precursor P net formation speed dmpfd/dt is calculated to assume the maximum value (peak value) when the gas mixture temperature Tmix coincides with the value T1, and decreases from the maximum value as the gas mixture temperature Tmix departs from the value T1. Eq. 40 corresponds to the precursor net formation speed calculation means.

When the precursor P net formation speed dmpfd/dt is calculated by use of Eq. 40, it becomes possible to simulate the above-described "phenomenon in which the soot generation speed decreases as the gas mixture temperature increases when the gas mixture temperature exceeds a certain temperature (the above-described value T1)." Therefore, the calculation load of the CPU 61 can be reduced, without greatly lowering the calculation accuracy of the precursor P generation speed d[P]mix/dt.

In the above-described embodiment, as in the reaction model shown in FIG. 5, a reaction model in which a precursor P of soot is generated in a reaction process in which soot is generated from fuel is always used. However, the soot generation amount estimation apparatus of the present invention may always use a reaction model shown in FIG. 16 in soot is generated directly from fuel.

Figure 16:
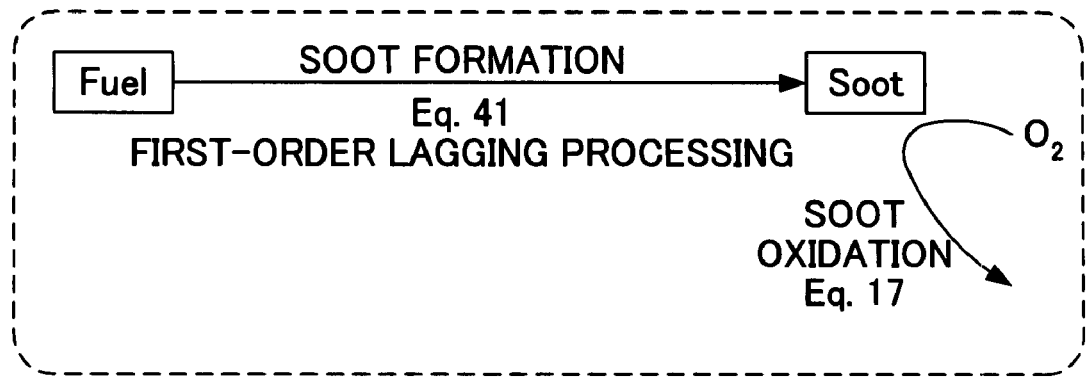
FIG. 16 is a diagram showing a reaction model which a soot generation amount estimation apparatus according to another modification of the embodiment uses and which represents a reaction process in which soot is generated directly from fuel.

In the reaction model shown in FIG. 16, the soot oxidation speed dmso/dt is calculated by use of the above-described Eq. 17 as in the above-described embodiment. Meanwhile, the speed at which soot is formed from fuel (i.e., the soot formation speed dmsf/dt) is obtained by performing a predetermined lagging processing (e.g., first-order lagging processing) on a value calculated by use of the following Eq. 41, which is a Gaussian equation.

$$dmsf/dt = A2 \cdot [\text{Fuel}]\text{mix}^{\alpha 21} \cdot Pg^{\alpha 22} \cdot \exp\left(\frac{-(Tmix - T2)^2}{2 \cdot \sigma 2^2}\right) \quad (41)$$

In Eq. 41, A2, α21, α22, T2 (peak temperature), and σ2 (standard deviation) are constants. [Fuel]mix represents the fuel concentration within the gas mixture; Pg represents the cylinder interior gas pressure; and Tmix represents the gas mixture temperature. According to Eq. 41, the soot formation speed dmsf/dt is calculated to assume the maximum value (peak value) when the gas mixture temperature Tmix coincides with the value T2, and decreases from the maximum value as the gas mixture temperature Tmix departs from the value T2.

By virtue of this calculation, it becomes possible to simulate the above-described "delay in soot generation (reaction)" through execution of the above-described lagging processing, and to simulate the above-described "phenomenon in which the soot generation speed decreases as the gas mixture temperature increases when the gas mixture temperature exceeds a certain temperature (the above-described value T2)." Therefore, in this case as well, the soot generation amount can be estimated accurately.

Notably, in this case, in the routine of FIG. 9, Steps 930 to 965 (excepting Step 955) are omitted, and in place of Step 950, a step for calculating the soot formation speed dmsf/dt by use of Eq. 41 is provided.

Figure 17:
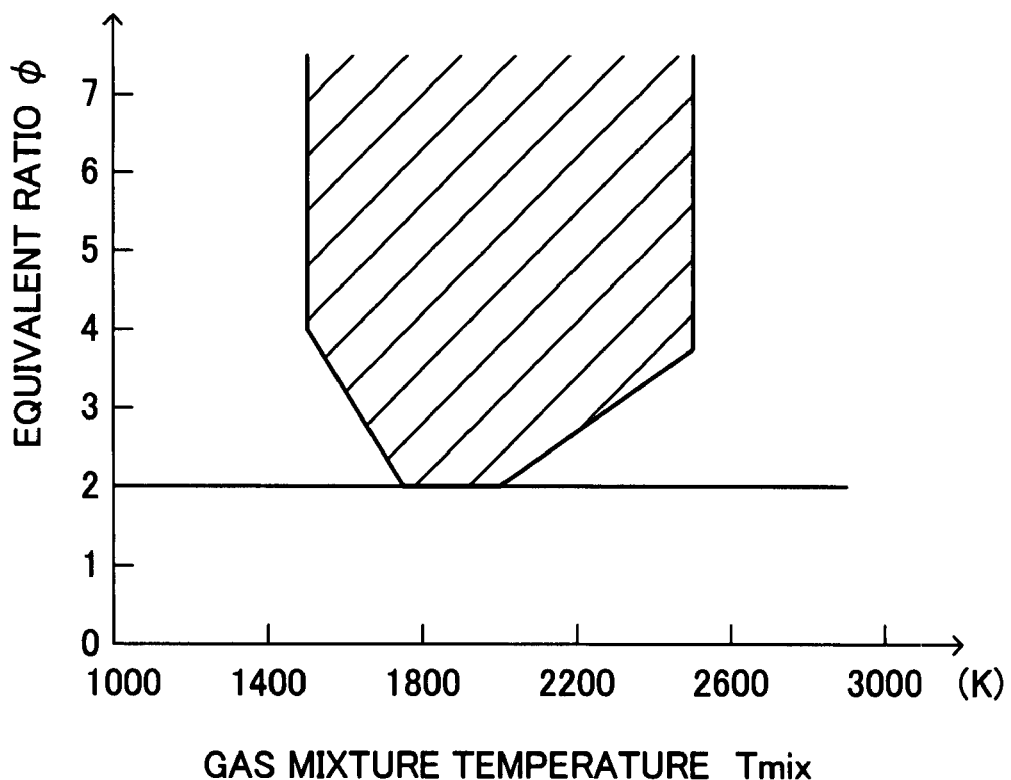
FIG. 17 is a graph showing the relation between temperature of gas mixture and equivalent ratio of the gas mixture, and a region in which soot is generated.

FIG. 17 is a graph showing the relation between the gas mixture temperature Tmix and the equivalent ratio φ (=1/excess air factor λ) of the gas mixture, and generation of soot. A hatched region shown in FIG. 17 corresponds to a region where soot is generated. The graph of FIG. 17 is described in detail in "Analysis of Mechanism of Diesel Engine No-smoke, Low-noise Combustion Method by Use of Numerical Simulation," Kazuhisa INAGAKI, Kazuhiro AKIHAMA, et al., the Transactions of the Japanese Society of Fuel, Vol 46, No. 136 (2004).

As can be understood from FIG. 17, when the equivalent ratio φ of the gas mixture is lower than a predetermined value (e.g., "2"), soot cannot be generated. In other words, when the equivalent ratio φ of the gas mixture is lower than the predetermined value, it is not required to perform calculations associated with estimation of the generation amount of soot.

In view of the above, the above-described embodiment, in which calculations for estimating the generation amount of soot are performed irrespective of the equivalent ratio φ of the gas mixture, may be modified such that the calculations for estimating the generation amount of soot are performed only when the equivalent ratio φ of the gas mixture is equal to or greater than the predetermined value (e.g., "2"). In this case, the calculation load of the CPU 61 can be reduced, without lowering the estimation accuracy of the soot generation amount.

Moreover, as can be understood from FIG. 17, the soot generation amount estimation apparatus of the present invention may be configured to perform the calculations for estimation of the soot generation amount only "when the relation between the equivalent ratio φ of the gas mixture and the gas mixture temperature Tmix falls within a predetermined range" corresponding to the hatched region of FIG. 17. By virtue of this configuration, it becomes possible to omit the calculations for estimation of the soot generation amount not only when the equivalent ratio φ of the gas mixture is less than the above-described predetermined value but also when the equivalent ratio φ of the gas mixture is equal to or greater than the above-described predetermined value but no soot is formed. As a result, the calculation load of the CPU 61 can be reduced further, without lowering the estimation accuracy of the soot generation amount.

In the above-described embodiment, as in the reaction model shown in FIG. 5, a reaction model in which a precursor P of soot is generated in a reaction process in which soot is generated from fuel is always used, whereby the above-described "delay in soot generation (reaction)" is simulated. However, when the gas mixture temperature Tmix reaches a certain temperature (high temperature), the degree of the "delay in soot generation (reaction)" decreases.

Figure 18:
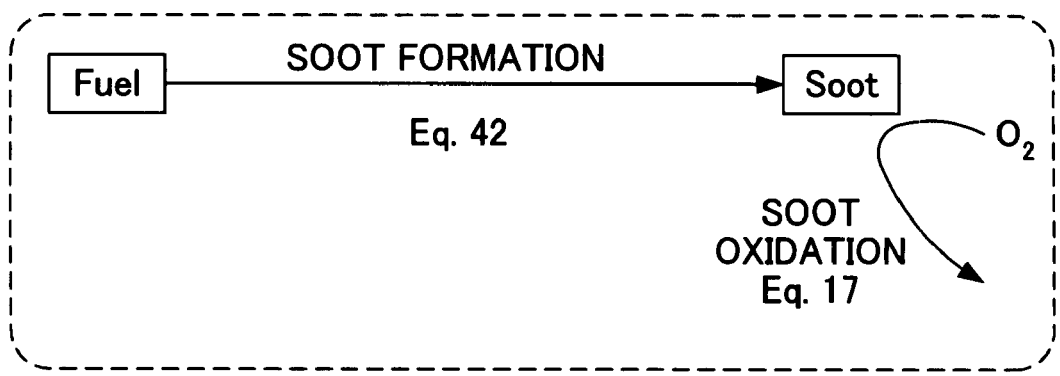
FIG. 18 is a diagram showing a reaction model which a soot generation amount estimation apparatus according to another modification of the embodiment uses and which represents a reaction process in which soot is generated directly from fuel.

In other words, when the gas mixture temperature Tmix reaches the certain temperature, the soot generation amount can be estimated with sufficient accuracy, even when a reaction model shown in FIG. 18, in which soot is generated directly from fuel, is used in place of the reaction model in which a precursor of soot is generated.

In the reaction model shown in FIG. 18, the soot oxidation speed dmso/dt is calculated by use of the above-described Eq. 17 as in the above-described embodiment. Meanwhile, the speed at which soot is formed from fuel (i.e., the soot formation speed dmsf/dt) is calculated by use of the following Eq. 42.

$$dmsf/dt = A3 \cdot [\text{Fuel}]mix^{\alpha 31} \cdot Pg^{\alpha 32} \cdot \exp\left(\frac{-(Tmix)}{Z}\right) \quad (42)$$

In Eq. 42, A3, α31, α32, and z are constants. [Fuel]mix represents the fuel concentration within the gas mixture; Pg represents the cylinder interior gas pressure; and Tmix represents the gas mixture temperature. According to Eq. 42, the soot formation speed dmsf/dt is calculated to decrease as the gas mixture temperature Tmix increases (above the certain temperature). Notably, Eq. 42 corresponds to the high-temperature-time soot formation speed calculation means.

By virtue of this calculation, it becomes possible to simulate the above-described "phenomenon in which the soot generation speed decreases as the gas mixture temperature increases when the gas mixture temperature exceeds a certain temperature." Therefore, in this case as well, the calculation load can be reduced, without lowering the estimation accuracy of the soot generation amount when the gas mixture temperature Tmix is equal to or higher than the above-described certain temperature.

Notably, in this case, in the routine of FIG. 9, Steps 930 to 965 (excepting Step 955) are omitted, and in place of Step 950, a step for calculating the soot formation speed dmsf/dt by use of Eq. 42 is provided.

Incidentally, in the above-described embodiment, the soot generation amount is not estimated in consideration of the properties of fuel. However, it is empirically known that, in general, the greater the content of polycyclic aromatic hydrocarbon contained in fuel (the mass concentration of the aromatic component within fuel; hereinafter referred to as the "aromatic component content x"), the more likely soot is formed from fuel. This tendency is considered to occur because the bonding force between carbon atoms increases with the aromatic component content of fuel, and the bonded carbon atoms become difficult to separate from each other.

Accordingly, from the viewpoint of accurate estimation of the soot generation amount, it is preferred to estimate the soot generation amount in consideration of the aromatic component content x. In this case, for example, it is preferred to replace the value of the fuel concentration [Fuel]mix with "[Fuel]mix·$(1+a \cdot x^b)$" in the above-described Eq. 3 (Step 930 of FIG. 9) in the above-described embodiment. Here, a and b are positive constants. Alternatively, it is preferred to replace the term of the fuel concentration [Fuel]mix with "([Fuel]mix)$^c$" in the above-described Eq. 3. Here, $c=1+d \cdot x$ (d is a positive constant).

In these cases, the value of the fuel concentration [Fuel]mix can be increased apparently with an increase in the aromatic component content x, to thereby increase the precursor P formation speed dmpf/dt (accordingly, the soot generation amount).

Moreover, in the above-described Eq. 3 (Step 930 of FIG. 9) in the above-described embodiment, the value of the activation energy Epf may be replaced with "Epf–$x^e$·E1." Here, e and E1 are positive constants. In this cases, the value of the activation energy Epf can be decreased apparently with an increase in the aromatic component content x, to thereby increase the soot formation speed dmsf/dt (accordingly, the soot generation amount).

In the above-described embodiment, the soot oxidation speed dmso/dt is calculated in accordance with the above-described Eq. 17. However, the soot oxidation speed dmso/dt may be calculated by use of a so-called NSC model. Notably, the NSC model is described in detail in Nagle, J. Strickl and -Constable, R. D., Proc. of the Fifth Carbon Conf., Vol. 1 (1962).

In the above-described embodiment, chemical reactions associated with the fuel consumption qr calculated in accordance with the above-described Eq. 32 (Step 865 of FIG. 8) include not only formation of the precursor P, firing reaction (hot flame reaction) and low-temperature oxidation reaction (cold flame reaction) but also other various chemical reactions. However, in consideration of the fact that, as compared with formation of the precursor P, firing reaction, and low-temperature oxidation reaction, the fuel consumption associated other various chemical reactions is sufficiently small, the soot generation amount estimation apparatus of the present invention may be configured to handle only the formation of the precursor P, the firing reaction, and the low-temperature oxidation reaction, as chemical reactions associated with the fuel consumption qr.

In the above-described embodiment, in order to reduce the calculation load of the CPU 61, the soot generation amount estimation apparatus is configured to stop the processing of integrating, with respect to time, the precursor P generation speed and the soot generation speed, after a point in time when the crank angel CA has passed an angle corresponding to TDC and the gas mixture temperature Tmix becomes lower than the soot formation reaction limit temperature Tmin. However, the soot generation amount estimation apparatus may be configured to stop the integrating processing not only at the above-described timing but also until the gas mixture temperature Tmix exceeds the soot formation reaction limit temperature Tmin before the crank angel CA reaches the angle corresponding to TDC. This configuration eliminate unnecessary calculations associated with determination of the soot generation amount, to thereby reduce the calculation load of the CPU 61 further.

In addition, in the above-described embodiment, the terms associated with the cylinder interior gas Pg may be omitted from any of the equations for calculating various reaction speeds (specifically, the above-described Eqs. 3, 4, 13, 16, and 17).

INDUSTRIAL APPLICABILITY

The soot generation amount estimation apparatus of the present invention can be applied to internal combustion engines, particularly, diesel engines.

The invention claimed is:

1. A soot generation amount estimation apparatus for an internal combustion engine including soot generation amount estimation means for estimating the amount of soot generated in a combustion chamber of the engine as a result of a reaction of fuel, the soot generation amount estimation means comprising:
    soot generation speed calculation means for calculating a generation speed of the soot by use of a reaction model regarding a reaction process in which the soot is generated from the fuel; and
    precursor generation speed calculation means for calculating a speed at which a precursor is generated from the fuel, the precursor generation speed calculation means including:
    precursor formation speed calculation means for calculating a speed at which the precursor is formed from the fuel,
    precursor decomposition speed calculation means for calculating a speed at which the formed precursor is thermally decomposed; and
    soot formation speed calculation means for calculating a speed at which the soot is formed from the precursor,
    wherein the precursor generation speed is calculated on the basis of the calculated precursor formation speed, precursor decomposition speed, and soot formation speed,
    wherein the soot generation speed calculation means calculates the soot generation speed on the basis of the calculated precursor generation speed.
    wherein the soot generation amount is estimated on the basis of the calculated soot generation speed, and
    wherein a model regarding a reaction process in which the soot is generated from the fuel via the precursor of the soot is used as the reaction model.

2. A soot generation amount estimation apparatus for an internal combustion engine according to claim 1, wherein the precursor generation speed calculation means comprises:
    precursor net formation speed calculation means for calculating a net formation speed of the precursor, which can be obtained by subtracting, from a speed at which the precursor is formed from the fuel, a speed at which the formed precursor is thermally decomposed; and
    soot formation speed calculation means for calculating a speed at which the soot is formed from the precursor,
    wherein the precursor generation speed is calculated on the basis of the calculated precursor net formation speed and soot formation speed.

3. A soot generation amount estimation apparatus for an internal combustion engine according to claim 1, wherein the soot generation speed calculation means comprises:
    soot formation speed calculation means for calculating a speed at which the soot is formed from the precursor; and
    soot oxidation speed calculation means for calculating a speed at which the formed soot is oxidized,
    wherein the soot generation speed is calculated on the basis of the calculated soot formation speed and soot oxidation speed.

4. A soot generation amount estimation apparatus for an internal combustion engine according to claim 1, wherein the soot formation speed calculation means comprises:
    first soot formation speed calculation means for calculating a first soot formation speed, which is a speed at which the soot is formed because of mutual collision of molecules of the precursor; and
    second soot formation speed calculation means for calculating a second soot formation speed, which is a speed at which the soot is additionally formed because of collision between molecules of the precursor and molecules of the soot,
    wherein the soot formation speed is calculated on the basis of the calculated first and second soot formation speeds.

5. A soot generation amount estimation apparatus for an internal combustion engine according to claim 4, wherein
    the first soot formation speed calculation means calculates the first soot formation speed in consideration of a probability of formation of the soot attributable to mutual collision of molecules of the precursor; and
    the second soot formation speed calculation means calculates the second soot formation speed in consideration of a probability of additional formation of the soot attributable to collision between molecules of the precursor and molecules of the soot.

6. A soot generation amount estimation apparatus for an internal combustion engine according to claim 5, wherein
    the first soot formation speed calculation means calculates the first soot formation speed in consideration of the number of mutual collisions of molecules of the precursor and/or a probability at which collided molecules of the precursor aggregate; and
    the second soot formation speed calculation means calculates the second soot formation speed in consideration of the number of collisions between molecules of the precursor and molecules of the soot and/or a probability at which collided molecules of the precursor and the soot aggregate.

7. A soot generation amount estimation apparatus for an internal combustion engine according to claim 6, wherein
    the first soot formation speed calculation means calculates the number of mutual collisions of molecules of the precursor on the basis of the concentration of the precursor within a gas mixture formed as a result of mixing of the fuel and a gas taken into the combustion chamber, and the temperature of the gas mixture; and the second soot formation speed calculation means calculates the number of collisions between molecules of the precursor and molecules of the soot on the basis of the concentration of the precursor within the gas mixture, the concentration of the soot within the gas mixture, and the temperature of the gas mixture.

8. A soot generation amount estimation apparatus for an internal combustion engine according to claim 6, wherein the probability at which the collided molecules of the precursor and the soot aggregate is greater than the probability at which the collided molecules of the precursor aggregate.

9. A soot generation amount estimation apparatus for an internal combustion engine according to claim 1, wherein the precursor is a monomer including at least one of PAH, aromatic intermediate, saturated polymer, and C2H2; and the soot is a polymer formed through aggregation of two or more molecules of the monomer.

10. A soot generation amount estimation apparatus for an internal combustion engine according to claim 1, wherein when the temperature of a gas mixture formed as a result of mixing of the fuel and a gas taken into the combustion chamber is equal to or higher than a predetermined temperature, in place of the model regarding the reaction process in which the soot is generated from the fuel via the precursor of the soot, a model regarding a reaction process in which the soot is generated directly from the fuel is used as the reaction model.

11. A soot generation amount estimation apparatus for an internal combustion engine according to claim 10, wherein
the soot generation amount estimation means further comprises high-temperature-time soot formation speed calculation means, operable when the temperature of the gas mixture is equal to or higher than the predetermined temperature, for calculating a speed at which the soot is formed by use of a function for obtaining a value of a speed at which the soot is formed from the fuel on the basis of the temperature of the gas mixture, the value decreasing as the temperature of the gas mixture increases; and
the soot generation speed calculation means calculates the soot generation speed on the basis of the soot formation speed calculated by the high-temperature-time soot formation speed calculation means, when the temperature of the gas mixture is equal to or higher than the predetermined temperature.

12. A soot generation amount estimation apparatus for an internal combustion engine according to claim 1, wherein a model regarding a reaction process in which the soot is directly generated from the fuel is used as the reaction model;
the soot generation amount estimation means further comprises soot formation speed calculation means for calculating a speed at which the soot is formed by use of a function for obtaining a value of a speed at which the soot is formed from the fuel on the basis of the temperature of a gas mixture formed as a result of mixing of the fuel and a gas taken into the combustion chamber, the value assuming the maximum value when the temperature of the gas mixture coincides with a specific temperature and decreasing from the maximum value as the temperature of the gas mixture departs from the specific temperature,
wherein the soot generation speed calculation means calculates the soot generation speed on the basis of the calculated soot formation speed.

13. A soot generation amount estimation apparatus for an internal combustion engine according to claim 12, wherein the soot formation speed calculation means calculates the soot formation speed in consideration of a time delay in the reaction process in which the soot is generated from the fuel.

14. A soot generation amount estimation apparatus for an internal combustion engine according to claim 1, wherein the soot generation amount estimation means performs calculations for estimation of the soot generation amount only when the equivalent ratio of a gas mixture formed as a result of mixing of the fuel and a gas taken into the combustion chamber is equal to or higher than a predetermined value.

15. A soot generation amount estimation apparatus for an internal combustion engine according to claim 14, wherein the soot generation amount estimation means performs the calculations for estimation of the soot generation amount only when the equivalent ratio of the gas mixture is equal to or higher than the predetermined value and the relation between the equivalent ratio of the gas mixture and the temperature of the gas mixture falls within a predetermined range.

16. A soot generation amount estimation apparatus for an internal combustion engine according to claim 1, wherein the soot generation amount estimation means estimates the soot generation amount in consideration of the properties of the fuel.

17. A soot generation amount estimation apparatus for an internal combustion engine according to claim 16, wherein the soot generation amount estimation means estimates the soot generation amount in consideration of the content of aromatic hydrocarbon contained in the fuel.

* * * * *